US012106003B2

(12) United States Patent
Kim et al.

(10) Patent No.: US 12,106,003 B2
(45) Date of Patent: Oct. 1, 2024

(54) WEARABLE DEVICE DISPLAYING VISUAL OBJECT USING SENSOR IN EXTERNAL ELECTRONIC DEVICE AND METHOD THEREOF

(71) Applicant: SAMSUNG ELECTRONICS CO., LTD., Suwon-si (KR)

(72) Inventors: Sungoh Kim, Suwon-si (KR); Choelmin Park, Suwon-si (KR); Jaeyung Yeo, Suwon-si (KR); Chungwan Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/227,605

(22) Filed: Jul. 28, 2023

(65) Prior Publication Data

US 2024/0143259 A1 May 2, 2024

Related U.S. Application Data

(63) Continuation of application No. PCT/KR2023/010232, filed on Jul. 17, 2023.

(30) Foreign Application Priority Data

Oct. 28, 2022 (KR) .......................... 10-2022-0141913
Nov. 3, 2022 (KR) .......................... 10-2022-0145648

(51) Int. Cl.
*G06F 3/14* (2006.01)
*G06F 3/0346* (2013.01)
(Continued)

(52) U.S. Cl.
CPC .............. *G06F 3/14* (2013.01); *G06F 3/0346* (2013.01); *G06F 3/04815* (2013.01); *G06F 3/04842* (2013.01)

(58) Field of Classification Search
None
See application file for complete search history.

(56) References Cited

U.S. PATENT DOCUMENTS 9,602,954 B2 3/2017 Youn et al.
10,365,882 B2 7/2019 Shin et al.
(Continued)

FOREIGN PATENT DOCUMENTS

JP 2017-107293 A 6/2017
KR 10-2015-0137828 A 12/2015
(Continued)

OTHER PUBLICATIONS

International Search Report dated Nov. 3, 2023 in International Application No. PCT/KR2023/010232.
(Continued)

*Primary Examiner* — Stephen T. Reed
(74) *Attorney, Agent, or Firm* — Sughrue Mion, PLLC

(57) ABSTRACT

A wearable device includes: a communication circuit; a display; and a processor, wherein the processor is configured to: display a visual object in the display; determine, based on an input of the user selecting the visual object, a sensor associated with the visual object; identify, among a plurality of external electronic devices connected to the wearable device through the communication circuit, an external electronic device including the sensor associated with the visual object; transmit, to the identified external electronic device, a first signal for requesting first information associated with the sensor; receiving a second signal including the first information associated with the sensor; update the visual object based on based on the first information; and display the updated visual object in the display.

20 Claims, 14 Drawing Sheets

(51) Int. Cl.
    *G06F 3/04815*     (2022.01)
    *G06F 3/04842*     (2022.01)

(56) References Cited

U.S. PATENT DOCUMENTS

| | | |
|---|---|---|
| 10,812,637 B2 | 10/2020 | Jung et al. |
| 10,997,949 B2 * | 5/2021 | John ................ G06F 3/011 |
| 11,199,709 B2 | 12/2021 | Son et al. |
| 11,249,314 B1 | 2/2022 | Lin et al. |
| 11,340,460 B2 | 5/2022 | Muldoon et al. |
| 11,663,784 B2 | 5/2023 | Nigam et al. |
| 2018/0246565 A1 * | 8/2018 | Moon ................ G06F 3/016 |
| 2020/0366897 A1 | 11/2020 | Trepte |
| 2022/0121411 A1 | 4/2022 | Zhang et al. |

FOREIGN PATENT DOCUMENTS

| | | |
|---|---|---|
| KR | 10-2016-0066951 A | 6/2016 |
| KR | 10-2017-0125618 A | 11/2017 |
| KR | 10-2020-0067567 A | 6/2020 |
| KR | 10-2021-0023680 A | 3/2021 |
| WO | 2022/131549 A1 | 6/2022 |

OTHER PUBLICATIONS

Written Opinion dated Nov. 3, 2023 in International Application No. PCT/KR2023/010232.

* cited by examiner

WEARABLE DEVICE DISPLAYING VISUAL OBJECT USING SENSOR IN EXTERNAL ELECTRONIC DEVICE AND METHOD THEREOF

CROSS-REFERENCE TO RELATED APPLICATIONS

This application is a by-pass continuation application of International Application No. PCT/KR2023/010232, filed on Jul. 17, 2023, which is based on and claims priority to Korean Patent Application Nos. 10-2022-0141913, filed on Oct. 28, 2022, and 10-2022-0145648, filed on Nov. 3, 2022, in the Korean Intellectual Property Office, the disclosures of which are incorporated by reference herein their entireties.

BACKGROUND

1. Field

The disclosure relates to a wearable device displaying a visual object by using a sensor in an external electronic device and a method thereof.

2. Description of Related Art

In order to provide an enhanced user experience, an electronic device provides an augmented reality (AR) service that displays information (e.g., visual objects) in association with an external object in the real-world. The electronic device may be worn by a user. For example, the electronic device may be an AR glasses or a head-mounted device (HMD).

SUMMARY

According to an aspect of the disclosure, a wearable device may comprise a communication circuit; a display and a processor operatively connected to the communication circuit and the display. The processor may be configured to display a visual object in the display. The processor may be configured to identify, based on an input of the user selecting the visual object, a sensor associated with the visual object. The processor may be configured to identify, among a plurality of external electronic devices connected to the wearable device through the communication circuit, an external electronic device including the sensor associated with the visual object. The processor may be configured to transmit, to the identified external electronic device, a first signal for requesting information associated with the sensor. The processor may be configured to receive a second signal including the information associated with the sensor. The processor may be configured to update the visual object based on the first information; and display the updated visual object in the display.

According to an aspect of the disclosure, a method of a wearable device may comprise displaying a visual object in a display of the wearable device. The method may comprise identifying, based on an input of the user, a sensor associated with the visual object. The method may comprise identifying, among a plurality of external electronic devices, an external electronic device including the sensor associated with the visual object. The method may comprise transmitting, to the identified external electronic device, a first signal for requesting first information associated with the sensor. The method may comprise receiving, from the identified external electronic device, a second signal including the information. The method may comprise updating the visual object based on the information, and displaying the updated visual object in the display of the wearable device.

According to an embodiment, a wearable device may comprise a communication circuit, a display, and a processor. The processor may be configured to display, while worn by a user, a screen including a visual object in a field-of-view (FoV) of the wearable device by controlling the display. The processor may be configured to identify, based on identifying an input of the user indicating to select the visual object, a sensor associated with the visual object. The processor may be configured to identify, among a plurality of external electronic devices connected to the wearable device through the communication circuit 540, an external electronic device including the sensor associated with the visual object. The processor may be configured to transmit, to the identified external electronic device from the plurality of external electronic devices, a first signal for requesting information associated with the sensor. The processor may be configured to, display the visual object in the FoV based on the information included in the second signal, based on receiving a second signal including the information from the external electronic device receiving the first signal.

According to an embodiment, a method of a wearable device may comprise displaying, while worn by a user, a screen including visual object in a field-of-view (FoV) of the wearable device by controlling the display. The method may comprise identifying, based on identifying an input of the user indicating to select the visual object, a sensor associated with the visual object. The method may comprise identifying, among a plurality of external electronic devices connected to the wearable device through a communication circuit 540, an external electronic device including the sensor associated with the visual object. The method may comprise transmitting, to the identified external electronic device from the plurality of external electronic devices, a first signal for requesting information associated with the sensor. The method may comprise, based on receiving a second signal including the information from the external electronic device receiving the first signal, displaying the visual object in the FoV based on the information included in the second signal.

According to an embodiment, a computer-readable medium for storing one or more programs, the one or more programs may be configured to, when executed by a processor of a wearable device, cause the processor of the wearable device to display, while worn by a user, a screen including visual object in a field-of-view (FoV) of the wearable device by controlling a display. The one or more programs may be configured to, when executed by the processor of the wearable device, cause the processor of the wearable device to identify, based on identifying an input of the user indicating to select the visual object, a sensor associated with the visual object. The one or more programs may be configured to, when executed by the processor of the wearable device, cause the processor of the wearable device to identify, among a plurality of external electronic devices connected to the wearable device through a communication circuit 540, an external electronic device including the sensor associated with the visual object. The one or more programs may be configured to, when executed by the processor of the wearable device, cause the processor of the wearable device to transmit, to the identified external electronic device from the plurality of external electronic devices, a first signal for requesting information associated with the sensor. The one or more programs may be configured to, when executed by the processor of the wearable device, cause the processor of the wearable device to display the visual object in the FoV based on the information included in the second signal, based on receiving a second signal including the information from the external electronic device receiving the first signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
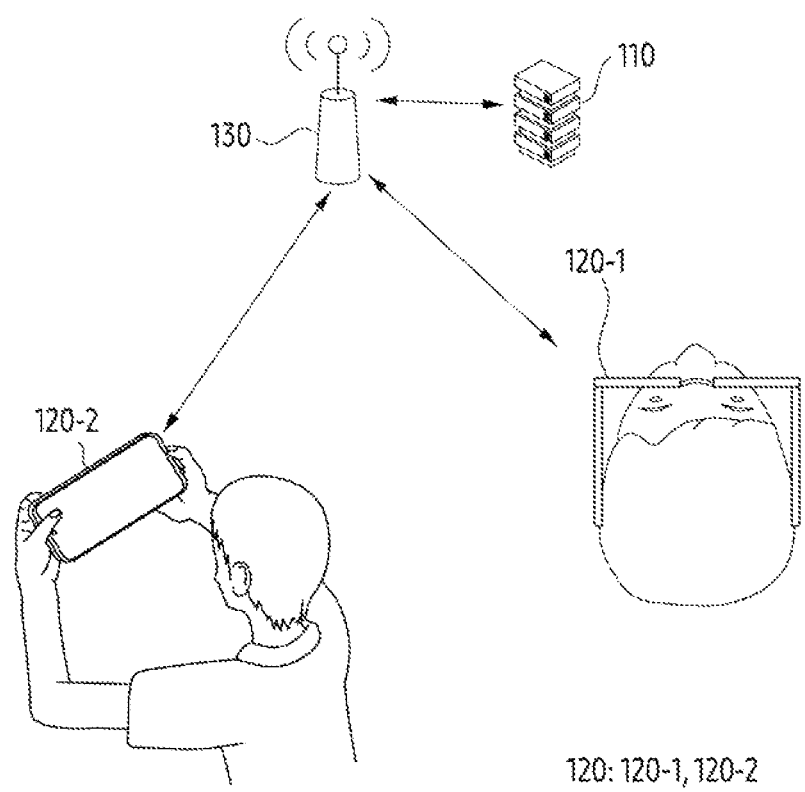
FIG. 1 illustrates an exemplary diagram of an environment in which a metaverse service is provided through a server.

Hereinafter, one or more embodiments of the present document will be described with reference to the accompanying drawings.

One or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Metaverse is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality, and it is characterized by using avatars to not only enjoy games or virtual reality (VR, cutting-edge technology that enables people to experience real-life experiences in a computerized virtual world), but also social and cultural activities like real reality.

Such a metaverse service may be provided in at least two forms. The first form is to provide services to users by using a server, and the second form is to provide services through individual contacts between users.

FIG. 1 is an exemplary diagram of a first embodiment environment 101 in which a metaverse service is provided through a server 110.

Referring to FIG. 1, the first embodiment environment 101 include a server 110 providing a metaverse service, a network (e.g., a network formed by at least one intermediate node 130 including an access point (AP) and/or a base station) connecting the server 110 and each of the user terminal (e.g., a user terminal 120 including a first terminal 120-1 and a second terminal 120-2), a user terminal that enable the use of services by accessing the server through the network and providing input and output to the metaverse service to the user.

In this case, the server 110 provides a virtual space so that the user terminal 120 may perform an activity in the virtual space. In addition, the user terminal 120 installs an S/W agent for accessing the virtual space provided by the server 110 to represent the information provided by the server 110 to the user or transmits the information that the user wants to represent in the virtual space to the server.

The S/W agent may be directly provided through the server 110 or downloaded from a public server, or may be embedded when purchasing a terminal.

Figure 2:
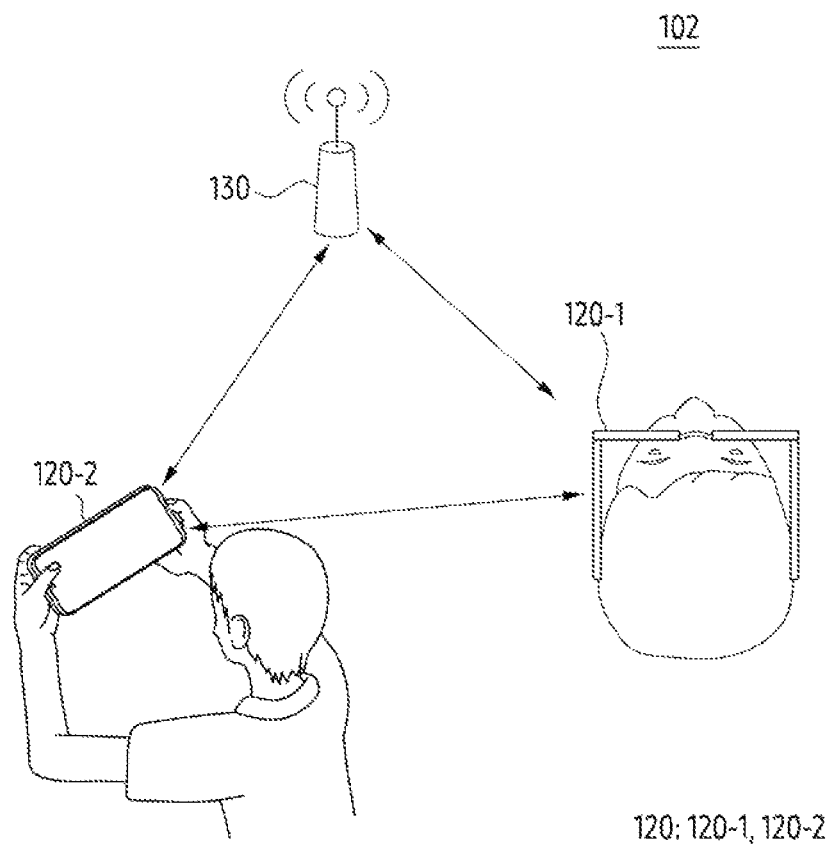
FIG. 2 illustrates an exemplary diagram of an environment in which a metaverse service is provided through a direct connection between user terminals and a second terminal.

FIG. 2 is an exemplary diagram of a second embodiment environment 102 in which a metaverse service is provided through direct connection between user terminals and a second terminal (e.g., a first terminal 120-1 and a second terminal 120-2).

Referring to FIG. 2, the environment 102 of the second embodiment includes a first terminal 120-1 providing a metaverse service, a network connecting each user terminal (e.g., a network formed by at least one intermediate node 130), and a second terminal 120-2 that allows a second user to use the service by inputting/outputting to the metaverse service by connecting to the first terminal 120-1 through the network.

The second embodiment is characterized in that the first terminal 120-1 provides a metaverse service by performing the role of a server (e.g., the server 110 of FIG. 1) in the first embodiment. That is, it may be seen that the metaverse environment may be configured only by connecting the device to the device.

In the first and second embodiments, the user terminal 120 (or the user terminal 120 including the first terminal 120-1 and the second terminal 120-2) may be made of various form factors, and is characterized in that it includes an output device that provides an image or/and sound to a user and an input device for inputting information into a metaverse service. Examples of various form factors of the user terminal 120 may include a smartphone (e.g., the second terminal 120-2), an AR device (e.g., the first terminal 120-1), a VR device, an MR device, a VST device, or TV or projector capable of input/output, and the like.

The network of the disclosure (e.g., a network formed by at least one intermediate node 130) includes all of various broadband networks including 3G, 4G, and 5G and a short-range network (e.g., a wired network or wireless network directly connecting the first terminal 120-1 and the second terminal 120-2) including Wi-Fi, BT, and the like.

Figure 3A:
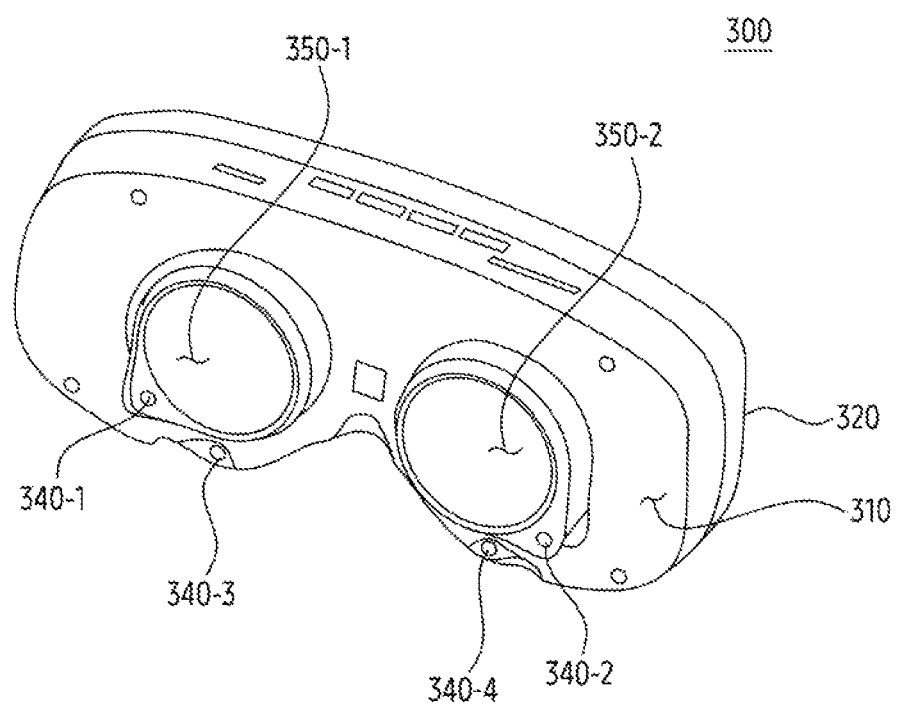
FIGS. 3A to 3B illustrate an example of an appearance of a wearable device, according to an embodiment.
Figure 3B:
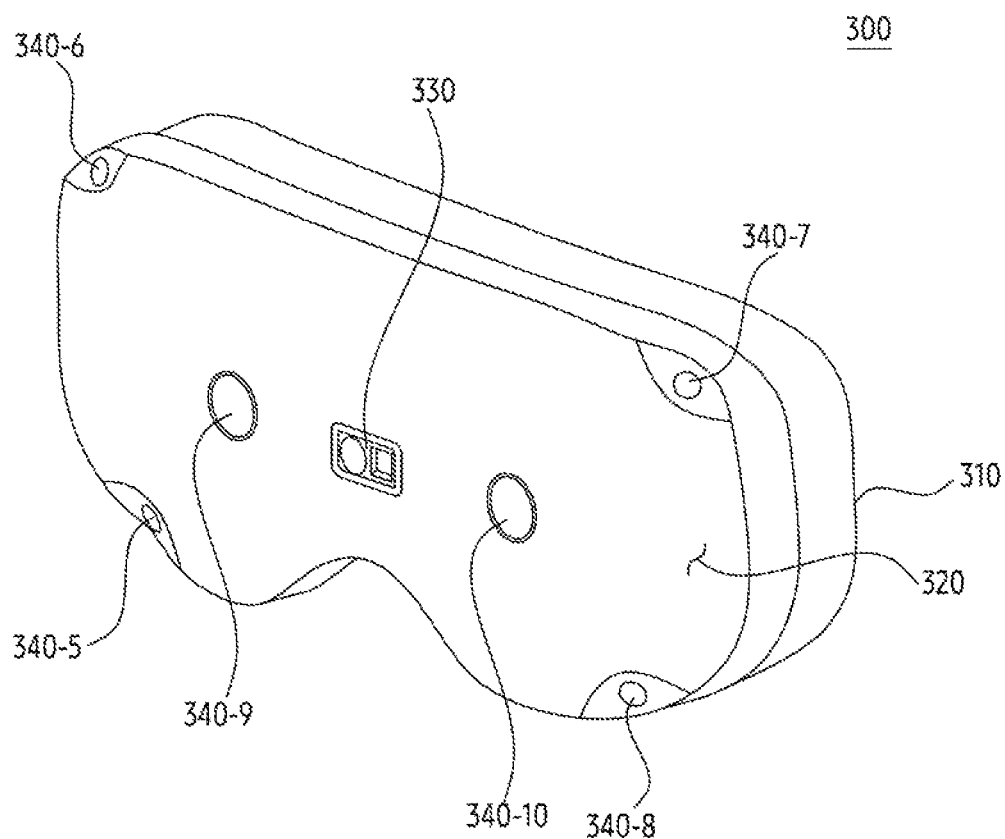

FIGS. 3A to 3B illustrate an example of an appearance of a wearable device, according to an embodiment. A wearable device 300 of FIGS. 3A to 3B may include the first terminal 120-1 of FIGS. 1 to 2. According to an embodiment, an example of an appearance of a first surface 310 of a housing of the wearable device 300 may be illustrated in FIG. 3A, and an example of an appearance of a second surface 320 opposite to the first surface 310 may be illustrated in FIG. 3B.

Referring to FIG. 3A, according to an embodiment, the first surface 310 of the wearable device 300 may have a form attachable on the user's body part (e.g., the user's face). Although not illustrated, the wearable device 300 may further include a strap and/or one or more temple to be fixed on the user's body part. A first display 350-1 for outputting an image to the left eye between two eyes of the user and a second display 350-2 for outputting an image to the right eye between two eyes may be disposed on the first surface 310. The wearable device 300 may further include rubber or silicon packing to prevent interference by a light (e.g., ambient light) different from a light emitted from the first display 350-1 and the second display 350-2, formed on the first surface 310.

According to an embodiment, the wearable device 300 may include cameras 340-1, 340-2 for photographing and/or tracking two eyes of the user adjacent to each of the first display 350-1 and the second display 350-2. The cameras 340-1 and 340-2 may be referred to as an eye tracking (ET) camera. According to an embodiment, the wearable device 300 may include cameras 340-3 and 340-4 for photographing and/or recognizing a user's face. The cameras 340-3 and 340-4 may be referred to as a face tracking (FT) camera.

Referring to FIG. 3B, a camera (e.g., cameras 340-5, 340-6, 340-7, 340-8, 340-9, and 340-10) and/or a sensor (e.g., a depth sensor 330) for obtaining information associated with the external environment of the wearable device 300 may be disposed on the second surface 320 opposite to the first surface 310 of FIG. 3A. For example, cameras 340-5, 340-6, 340-7, 340-8, 340-9, and 340-10 may be disposed on the second surface 320 to recognize an external object different from the wearable devices 300. For example, the wearable device 300 may obtain an image and/or video to be transmitted to each of the user's two eyes by using cameras 340-9 and 340-10. The camera 340-9 may be disposed on the second surface 320 of the wearable device 300 to obtain an image to be displayed through the second display 350-2 corresponding to the right eye among the two eyes. The camera 340-10 may be disposed on the second surface 320 of the wearable device 300 to obtain an image to be displayed through the first display 350-1 corresponding to the left eye among the two eyes.

According to an embodiment, the wearable device 300 may include a depth sensor 330 disposed on the second surface 320 to identify or determine a distance between the wearable device 300 and an external object. The wearable device 300 may obtain spatial information (e.g., depth map) on at least a part of the FoV of the user wearing the wearable device 300, by using the depth sensor 330.

Although not illustrated, a microphone for obtaining sound outputted from an external object may be disposed on the second surface 320 of the wearable device 300. The number of microphones may be one or more according to embodiments.

As described above, according to an embodiment, the wearable device 300 may have a form factor to be worn on a user's head. The wearable device 300 may provide a user experience based on augmented reality, virtual reality, and/or mixed reality, in a state worn on the head. The wearable device 300 and a server (e.g., the server 110 of FIG. 1) connected to the wearable device 300 may provide an on-demand service and/or a metaverse service providing a video of a location and/or a place selected by the user, by using cameras 340-5, 340-6, 340-7, 340-8, 340-9, and 340-10 for recording a video for an external space. FIGS. 3A and 3B illustrate a diagram associated with the HMD, but are not limited thereto. For example, the wearable device 300 may include an electronic device for implementing augmented reality, such the AR glasses.

Figure 4A:
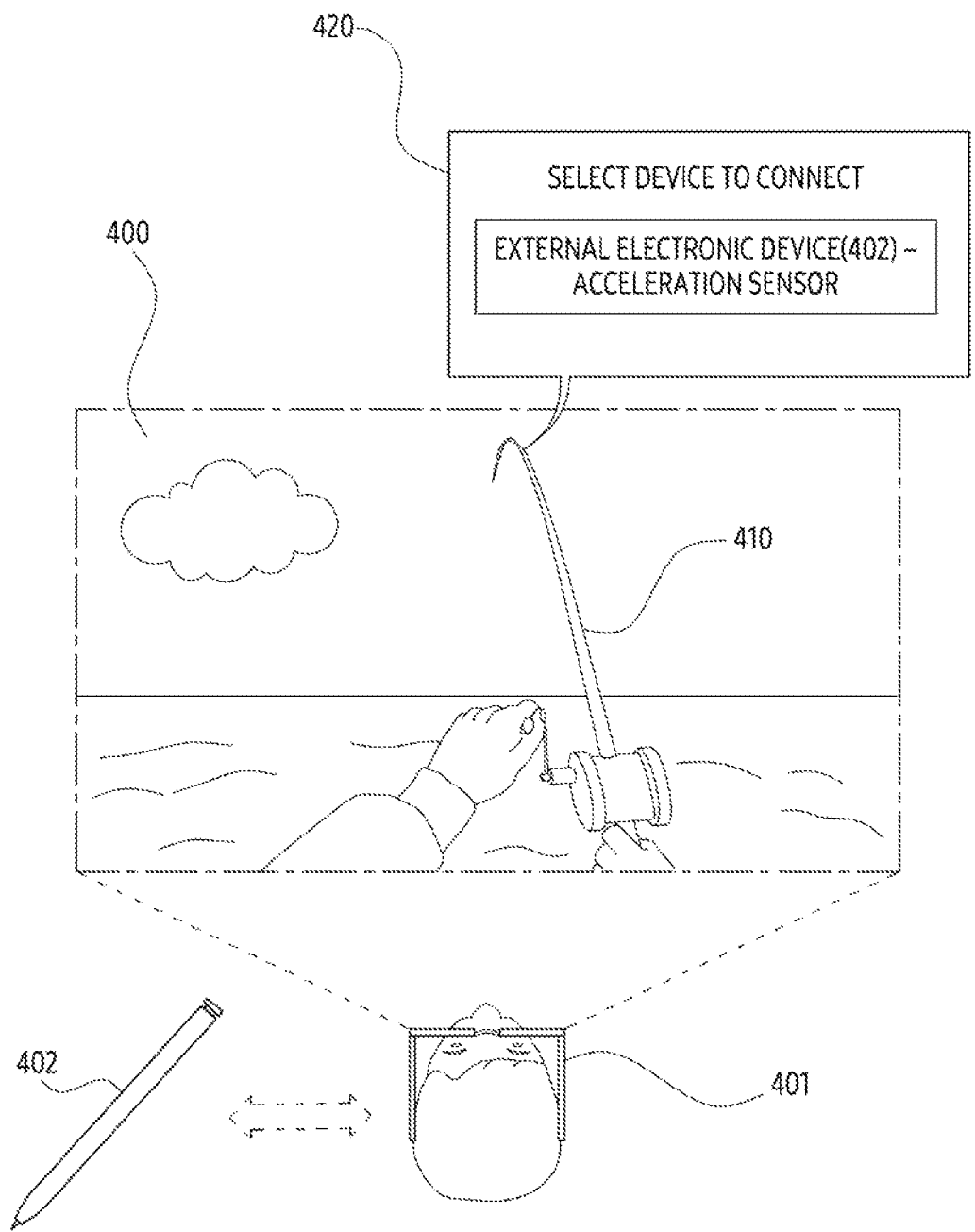
FIG. 4A illustrates an example of a screen displayed in a wearable device, according to an embodiment.
Figure 4B:
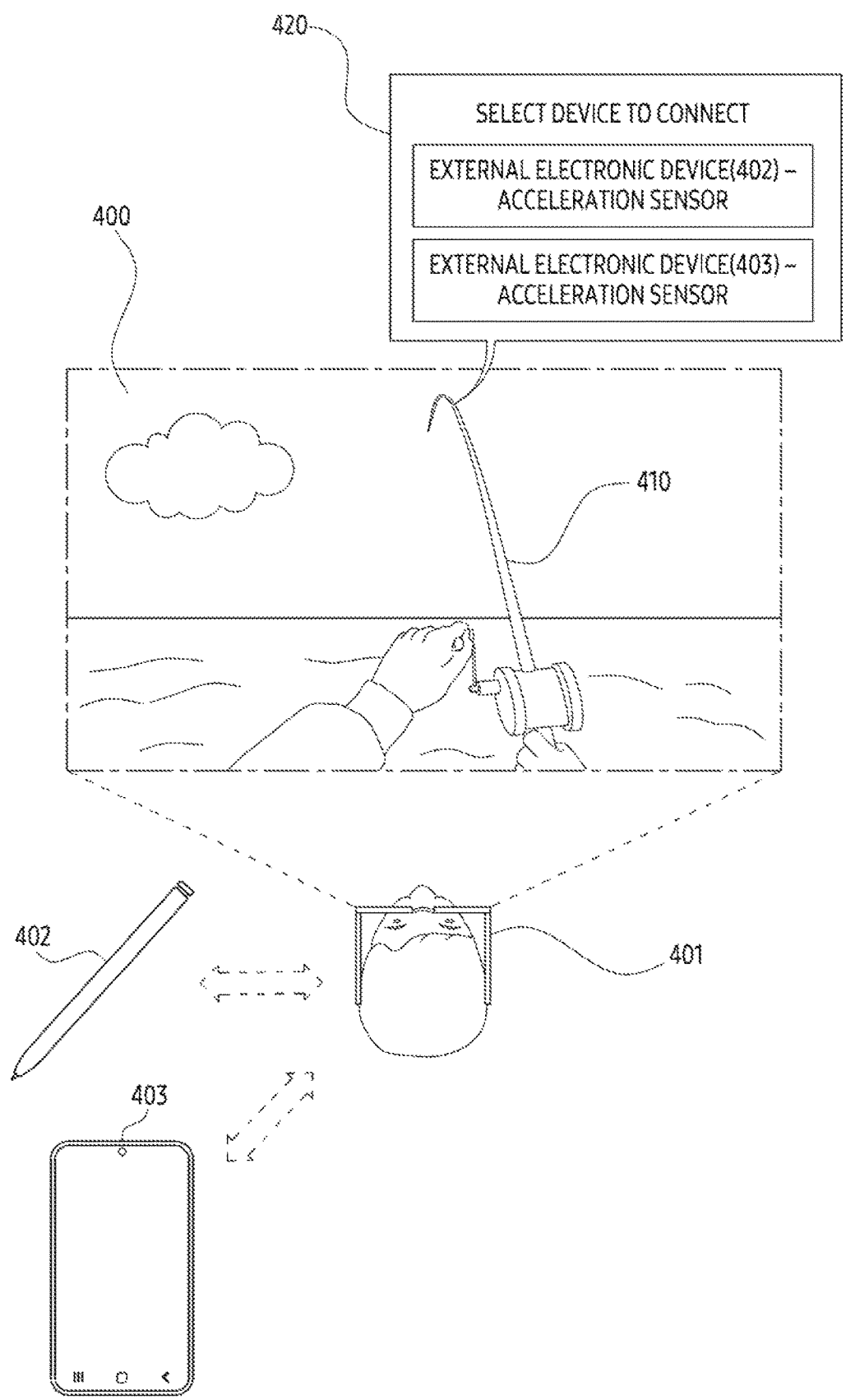
FIG. 4B illustrates an example of a screen displayed in a wearable device, according to an embodiment.

FIG. 4A illustrates an example of a screen displayed in a wearable device, according to an embodiment. FIG. 4B illustrates an example of a screen displayed in a wearable device, according to an embodiment. A wearable device 401 of FIGS. 4A to 4B may include the first terminal 120-1 of FIGS. 1 to 2 and the wearable device 300 of FIGS. 3A to 3B. For example, the wearable devices 401 may include a head-mounted display (HMD) wearable on the user's head.

According to an embodiment, the wearable device 401 may include a camera (e.g., cameras 340-9 and 340-10 of FIG. 3B) disposed toward the front of the user, in a state worn by the user. The front of the user may include a direction in which the user's head and/or two eyes included in the head face. In order to provide a user interface (UI) based on AR, virtual reality (VR), and/or mixed reality (MR) to a user wearing the wearable device 401, the wearable device 401 may control the camera. The UI may be associated with a metaverse service provided by the wearable device 401 and/or a server (e.g., the server 110 of FIG. 1) connected to the wearable device 401.

Referring to FIGS. 4A to 4B, according to an embodiment, the wearable device 401 may display a screen 400 based on execution of an application. The wearable device 401 may display a visual object 410 while displaying the screen 400. For example, the wearable device 401 may identify an external electronic device 402 based on an application executed to display the visual object 410. For example, the visual object 410 may be referred to as a virtual object. The visual object 410 may be changed by a user input of the wearable device 401. For example, the visual object 410 may be changed by an input of another external electronic device (e.g., a controller) linked to the wearable device 401. For example, the visual object 410 may be changed by an input to a button included in the wearable device 401. A method of changing the visual object 410 is not limited to the example.

According to an embodiment, the wearable device 401 may identify a plurality of external electronic devices to change the visual object 410. For example, the wearable device 401 may identify the external electronic device 402 associated with a change of the visual object 410, from among the plurality of external electronic devices. For example, the external electronic device 402 associated with the change of the visual object 410 may be associated with a control of the visual object 410 displayed on the screen 400 of the wearable device 401. The wearable device 401 may transmit a first signal for requesting information associated with a sensor included in the external electronic device 402 to the external electronic device 402, based on identifying the external electronic device 402. The wearable device 401 may receive a second signal based on transmitting the first signal to the external electronic device 402. For example, the second signal may include information associated with a sensor included in the external electronic device 402. The information associated with the sensor may include a category of a sensor included in the external electronic device 402. The information associated with the sensor may include a type of the sensor included in the external electronic device 402. The information associated with the sensor may include information associated with sensitivity of the sensor included in the external electronic device 402.

According to an embodiment, the wearable device 401 may receive a second signal including information associated with the sensor included in external electronic device 402. The wearable device 401 may display a pop-up window 420 including information associated with the external electronic device 402 and/or the sensor included in the external electronic device 402, based on receiving the second signal. For example, the wearable device 401 may display a pop-up window 420 for selecting the external electronic device 402. The wearable devices 401 may receive an input indicating to select an external electronic device 402 included in the pop-up window 420. The wearable device 401 may establish a connection with the external electronic device 402, based on receiving an input indicating to select the external electronic device 402. For example, the wearable device 401 may be connected to the external electronic device 402 through a communication circuit (e.g., the communication circuit 540 of FIG. 5), based on receiving the input. For example, the wearable device 401 may establish a communication link with the external electronic device 402 through a communication circuit. For example, the wearable device 401 may establish a connection with external electronic devices 402 based on a radio access technology (RAT). For example, the RAT may include a short-range wireless communication and/or a long-distance wireless communication. For example, the short-range wireless communication may include Bluetooth, Bluetooth low energy (BLE), near field communication (NFC), and/or Wi-Fi. However, it is not limited thereto. For example, the long-distance wireless communication may include Ethernet, local area network (LAN), wide area network (WAN), ZigBee, long term evolution (LTE), and/or 5G new radio (NR).

Referring to FIG. 4B, according to an embodiment, the wearable device 401 may display a screen 400 based on execution of an application. The wearable device 401 may display a visual object 410 while displaying the screen 400. The wearable devices 401 may identify a plurality of external electronic devices 402 and 403, based on an application executed to display the visual object 410. The wearable device 401 may transmit first signals for requesting information associated with sensors included in the plurality of external electronic devices 402 and 403, through a communication circuit, to the plurality of external electronic devices 402 and 403. The first signals may be substantially the same signal as the signal transmitted to the external electronic device 402 described in FIG. 4A. The number of the plurality of external electronic devices 402 and 403 is not limited to the embodiment of FIG. 4B.

According to an embodiment, the wearable device 401 may receive second signals from the plurality of external electrons 402 and 403, based on transmitting the first signal. The second signals may include information included in the second signal received from the external electronic device 402 described in FIG. 4A. For example, a second signal transmitted from the external electronic device 402 between the second signals may include information associated with the sensor included in the external electronic device 402. A second signal transmitted from the external electronic device 403 between the second signals may include information associated with a sensor included in the external electronic device 403. According to an embodiment, the wearable device 401 may display a pop-up window 420 including information associated with a sensor included in the plurality of external electronic devices 402 and 403, based on receiving second signals from the plurality of external electronic devices 402 and 403. The wearable device 401 may receive an input indicating to select at least one of the plurality of external electronic devices 402 and 403 displayed in the pop-up window 420. The wearable device 401 may establish a communication link with at least one of the plurality of selected external electronic devices 402 and 403, through a communication circuit based on the input. The following description may be an example of establishing a communication link with the external electronic device 402, based on receiving an input indicating to select the external electronic device 402 included in the pop-up window 420.

Referring to FIGS. 4A to 4B, according to an embodiment, the wearable device 401 may establish a communication link with the external electronic device 402 through a communication circuit. The wearable device 401 may receive a third signal from the external electronic device 402, in a state of establishing a communication link with the external electronic device 402. The third signal may include data of a sensor included in the external electronic device 402. For example, the third signal may be associated with a data change amount of a sensor included in the external electronic device 402. The wearable device 401 may change the visual object 410 based on receiving the third signal. For example, the third signal may be associated with data of at least one sensor included in the external electronic device 401. The wearable device 401 may change the visual object 410 based on receiving the third signal.

As described above, according to an embodiment, the wearable device 401 may execute an application. The wearable device 401 may display the visual object 410 through a screen displayed in the FoV based on execution of the application. The wearable device 401 may identify a plurality of external electronic devices for changing the visual object 410 while displaying the visual object 410. The wearable device 401 may identify the external electronic device 402 among the plurality of external electronic devices. The wearable device 401 may identify the external electronic device 402 including a sensor associated with a change of the visual object 410, among the plurality of external electronic devices. The wearable device 401 may transmit a first signal requesting information associated with a sensor included in the external electronic device 402 to the external electronic device 402, in a state of identifying the external electronic device 402. The wearable device 401 may receive a second signal including information associated with the sensor from the external electronic device 402, based on transmitting the first signal. The wearable device 401 may establish a communication link with the external electronic device 402 based on receiving the second signal. The wearable device 401 may receive a third signal that changes the visual object 410, in a state that a communication link with the external electronic device 402 is established. The wearable device 401 may change the visual object 410 based on the third signal received from the external electronic device 402. The wearable device 401 may enhance a user experience of the wearable device 401 by changing the visual object 410 based on the third signal.

Figure 5:
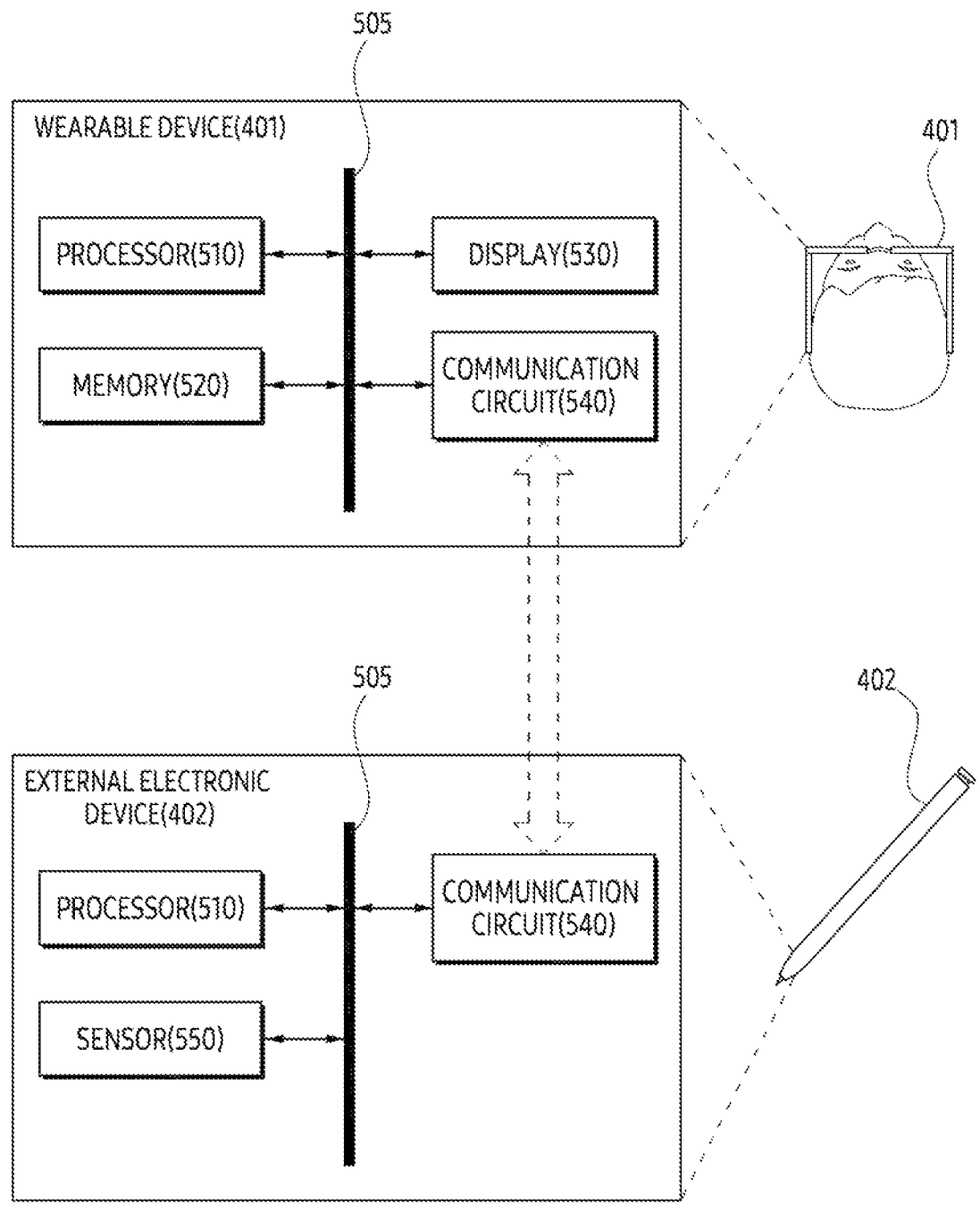
FIG. 5 illustrates an example of a block diagram of a wearable device, according to an embodiment.

FIG. 5 illustrates an example of a block diagram of a wearable device, according to an embodiment. A wearable device 401 and an external electronic device 402 of FIG. 5 may include the wearable device 401 and the external electronic device 402 of FIG. 4A to 4B. Referring to FIG. 5, the wired network may include a network such as Internet, local area network (LAN), a wide area network (WAN), an Ethernet, or a combination thereof. The wireless network may include a network such as a network such as long term evolution (LTE), 5g new radio (NR), wireless fidelity (Wi-Fi), ZigBee, near field communication (NFC), Bluetooth, Bluetooth low energy (BLE), or a combination thereof.

Referring to FIG. 5, according to an embodiment, the wearable device 401 may include at least one of a processor 510, a memory 520, a display 530, or a communication circuit 540. The processor 510, the memory 520, the display 530, and the communication circuit 540 may be electronically and/or operably coupled with each other by electronic components such as a communication bus 505. Hereinafter, the operational coupling of hardware components may mean that a direct or indirect connection between hardware components is established by wire or wirelessly, so that a second hardware component is controlled by a first hardware component among the hardware components. Although illustrated in different blocks, embodiments are not limited thereto. A part of the hardware of FIG. 5 (e.g., at least a part of the processor 510, memory 520, and communication circuit 540) may be included in a single integrated circuit such as a system on a chip (SoC). A type and/or numbers of hardware component included in the wearable device 401 are not limited as illustrated in FIG. 5. For example, the wearable device 401 may include only a part of the hardware illustrated in FIG. 5.

According to an embodiment, the processor 510 of the wearable device 401 may include a hardware for processing data based on one or more instructions. For example, the hardware for processing data may include an arithmetic and logic unit (ALU), a floating point unit (FPU), and a field programmable gate array (FPGA), a central processing unit (CPU), and/or application processor (AP). For example, the processor 510 may have a structure of a single-core processor, or a structure of a multi-core processor such as a dual core, a quad core, a hexa core, or an octa core.

The memory 520 of the wearable device 401 may include hardware components for storing data and/or instructions inputted and/or outputted to the processor 510 of the wearable device 401. For example, the memory 520 may include a volatile memory such as random-access memory (RAM) and/or a non-volatile memory such as read-only memory (ROM). For example, the volatile memory may include at least one of dynamic RAM (DRAM), static RAM (SRAM), cache RAM (PSRAM), and pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, a solid state drive (SDD), and an embedded multi-media card (eMMC).

According to an embodiment, the display 530 of the wearable device 401 may output visualized information to the user. For example, the display 530 may output visualized information to a user, by being controlled by the processor 510 including a circuit such as a graphical processing unit (GPU). The display 530 may include a flat panel display (FPD) and/or an electronic paper. The FPD may include a liquid crystal display (LCD), a plasma display panel (PDP), and/or one or more light emitting diode (LED). The LED may include an organic LED (OLED). The display 530 of FIG. 5 may include at least one display 350 of FIGS. 3A to 3B.

According to an embodiment, the communication circuit 540 of the wearable device 401 may include hardware components for supporting the transmission and/or reception of an electrical signal between the wearable device 401 and the external electronic device 402. Only the external electronic device 402 is illustrated as an electronic device connected to the wearable device 401 through the communication circuit 540, but an embodiment is not limited thereto. For example, the communication circuit 540 may include at least one of a MODEM, an antenna, and an optic/electronic (O/E) converter. The communication circuit 540 may support transmission and/or reception of an electrical signal, based on various types of protocols such as Ethernet, local area network (LAN), wide area network (WAN), wireless fidelity (Wi-Fi), Bluetooth, Bluetooth low energy (BLE), ZigBee, long term evolution (LTE), and 5th generation new radio (5G NR).

According to an embodiment, the wearable device 401 may include an output means for outputting information in a form other than a visualized form. For example, the wearable device 401 may include a speaker for outputting an acoustic signal. For example, the wearable device 401 may include a motor for providing haptic feedback based on vibration.

Referring to FIG. 5, according to an embodiment, the external electronic device 402 may include at least one of a processor 510, a communication circuit 540, and a sensor 550. In the external electronic device 402, the processor 510, the communication circuit 540, and the sensor 550 may be electronically and/or operably coupled through the communication bus 505. The processor 510 and the communication circuit 540 included in the external electronic device 402 may include hardware components and/or circuits corresponding to the processor 510 and the communication circuit 540 of the wearable device 401. Hereinafter, in order to reduce repetition, the description of the processor 510 and the communication circuit 540 included in the external electronic device 402 may be omitted within the range of overlapping the processor 510 and the communication circuit 540 in the wearable device 401.

According to an embodiment, the sensor 550 of the external electronic device 402 may generate electrical information that may be processed by the processor 510 of the external electronic device 402 from non-electronic information associated with the external electronic device 402. For example, the sensor 550 may include a global positioning system (GPS) sensor to detect geographic location of the external electronic device 402. For example, in addition to the above GPS method, the sensor 550 may generate information indicating geographic location of the external electronic device 402, based on a global navigation satellite system (GNSS) such as Galileo and BeiDou (Compass).

For example, the sensor 550 may include an acceleration sensor and/or a gyro sensor for measuring a physical movement of the external electronic device 402. For example, the acceleration sensor may output electrical information indicating the magnitude of gravitational acceleration measured on each of a plurality of designated axes (e.g., the x-axis, the y-axis, and the z-axis) perpendicular to each other. For example, the processor 510 of the external electronic device 402 may detect a motion of the external electronic device 402 in a physical space, based on electrical information outputted from the acceleration sensor. The motion detected by the external electronic device 402 may indicate orientation of the external electronic device 402 detected by the acceleration sensor and/or a form of the external electronic device 402.

For example, the gyro sensor may obtain an electrical signal associated with the rotational speed of the external electronic device 402 (e.g., the angular velocity of the external electronic device 402 for the designated axes). The external electronic device 402 may identify the motion of the external electronic device 402 based on the electrical signal obtained through the gyro sensor. For example, the motion may be associated with the rotational motion of the external electronic device 402. For example, the external electronic device 402 may identify the magnitude of the rotational motion. The magnitude of the rotation motion may be associated with the size of the angular velocity of the external electronic device 402 rotating based on an axis formed inside or outside the external electronic device 402.

For example, the sensor 550 may include a hall sensor. The hall sensor may include one or more magnets and/or one or more magnetic sensors. One or more magnets included in the hall sensor or at least one of the one or more magnetic sensors may be disposed on different locations in the external electronic device 402. A location relationship in the external electronic device 402 of the one or more magnets and/or the one or more magnetic sensors may change according to a form of the external electronic device 402. The external electronic device 402 may measure a change in the location relationship through the one or more magnetic sensors. The change in the location relationship may cause a change in a magnetic field formed by the one or more magnets. The external electronic device 402 may obtain an electrical signal indicating a change in the magnetic field by using a hall sensor. The external electronic device 402 may distinguish a rotation direction or rotation speed of a wheel or dial included in the external electronic device 402, by using the electrical signal obtained from the hole sensor. The wheel or dial may be a hardware component disposed on the external electronic device 402. The wheel or dial may be disposed on the external electronic device 402 and rotatable based on an axis formed within the external electronic device 402. Based on the rotation of the wheel or dial, the electrical signal identified by the sensor 550 included in the external electronic device 402 may be changed. The wearable device 401 may change a display of a visual object displayed in a screen, based on data including a change of the electrical signal from the external electronic device 402.

For example, the sensor 550 may include a fingerprint recognition sensor. The fingerprint recognition sensor may include an optical fingerprint recognition sensor, a capacitive fingerprint recognition sensor, and/or an ultrasonic fingerprint recognition sensor. For example, the external electronic device 402 may identify whether an image stored in the memory 520 matches an image obtained from the optical fingerprint recognition sensor. The external electronic device 402 may identify that the user's fingerprint matches based on matching of the images. For example, the external electronic device 402 may identify whether a capacitance of a capacitor included in the capacitive fingerprint recognition sensor matches a capacitance stored in the memory 520. The external electronic device 402 may identify that the user's fingerprint matches based on the matching of the capacitance. For example, the external electronic device 402 may transmit ultrasonic waves generated based on the ultrasonic fingerprint recognition sensors to an external object (e.g., the user's fingers). The external electronic device 402 may receive reflection waves reflected by the external object. Based on receiving the reflection waves, the external electronic device 402 may identify whether the reflection waves matches data associated with the ultrasonic fingerprint recognition sensor stored in the memory 520. The external electronic device 402 may identify that a user's fingerprint matches, based on the reflection waves and data stored in the memory 520.

According to an embodiment, the wearable device 401 may execute an application. The wearable device 401 may display a visual object (e.g., the visual object 410 of FIG. 4A to 4B) on a screen (e.g., the screen 400 of FIG. 4A to 4B) displayed in FoV, in a state that the application is executed. The wearable device 401 may identify a plurality of external electronic devices to change a display of the visual object, based on displaying the visual object. The wearable device 401 may identify a sensor for changing the visual object, based on an instruction included in the application. The wearable device 401 may detect a plurality of external electronic devices based on identifying the sensor for changing the visual object. The wearable device 401 may detect an external electronic device including the sensor for changing the visual object, based on detecting the plurality of external electronic devices. For example, when an acceleration sensor is required to change the visual object, the wearable device 401 may detect a plurality of external electronic devices including the acceleration sensor. The wearable device 401 may transmit a first signal requesting information associated with a sensor included in the plurality of external electronic devices to the plurality of external electronic devices, based on detecting the plurality of external electronic devices. The wearable device 401 may receive a second signal for indicating information associated with the sensor from the plurality of external electronic devices that receive the first signal. The wearable device 401 may display a pop-up window (e.g., the pop-up window 420 of FIGS. 4A to 4B) based on receiving the second signal. For example, the wearable device 401 may display names of the plurality of external electronic devices, a type (or category) of a sensor corresponding to each of the plurality of external electronic devices, sensitivity of the sensor, or a combination thereof, within the pop-up window. The wearable device 401 may receive an input for establishing a communication link with at least one external electronic device among the plurality of external electronic devices displayed within the pop-up window. The wearable device 401 may establish a communication link with at least one external electronic device based on the input.

FIG. 5 may be a state in which a communication link between the wearable device 401 and the external electronic device 402 is established. Although only one external electronic device 402 is illustrated, the number of external electronic devices in which a communication link is established is not limited. Referring to FIG. 5, the wearable device 401 may receive a third signal for changing a display of a visual object displayed in the FoV, in a state in which the communication link with the external electronic device 402 is established. For example, the third signal may include data associated with an electrical signal obtained from a sensor of the external electronic device 402. For example, the third signal may include data for changing the visual object based on data associated with the electrical signal. For example, the wearable device 401 may change a display of the visual object based on data included in the third signal. For example, changing a display of the visual object may be associated with a movement, a rotation, and/or a motion of the external electronic device 402. The wearable device 401 may change a display of the visual object, based on a third signal including sensor data corresponding to a movement of the external electronic device 402. For example, the wearable device 401 may change a display of the visual object to match the movement of the external electronic device 402.

According to an embodiment, the wearable device 401 may establish a connection with the external electronic device 402. The wearable device 401 may transmit data to be calculated in the wearable device 401 to the external electronic device 402. The wearable device 401 may transmit data that may be calculated by the processor 510 of the external electronic device 402, in a state of establishing a connection with the external electronic device 402. For example, the wearable device 401 may transmit data to be calculated by the processor 510 of the wearable device 401 to the external electronic device 402. The data transmitted to the external electronic device 402 may be calculated by the processor 510 of the external electronic device 402. The external electronic device 402 may transmit, to the wearable device 401, a result value in which calculation of the data is completed, based on calculating the data. The wearable device 401 may receive the result value. The wearable device 401 receiving the result value may perform a function of the wearable device 401 by using the result value.

As described above, according to an embodiment, the wearable device 401 may establish a communication link with the external electronic device 402. The wearable device 401 may transmit and/or receive a signal and/or data with the external electronic device 402, in a state of establishing a communication link with the external electronic device 402. The wearable device 401 may change a visual object, based on a signal transmitted and/or received with the external electronic device 402. The wearable device 401 may change the visual object, based on a third signal transmitted from the external electronic device 402. The wearable device 401 may reduce data calculated through the processor 510 of the wearable device 401, by changing the visual object based on the third signal transmitted from the external electronic device 402. The wearable device 401 may enhance a user experience of the wearable device 401, by changing the visual object based on the third signal.

Figure 6:
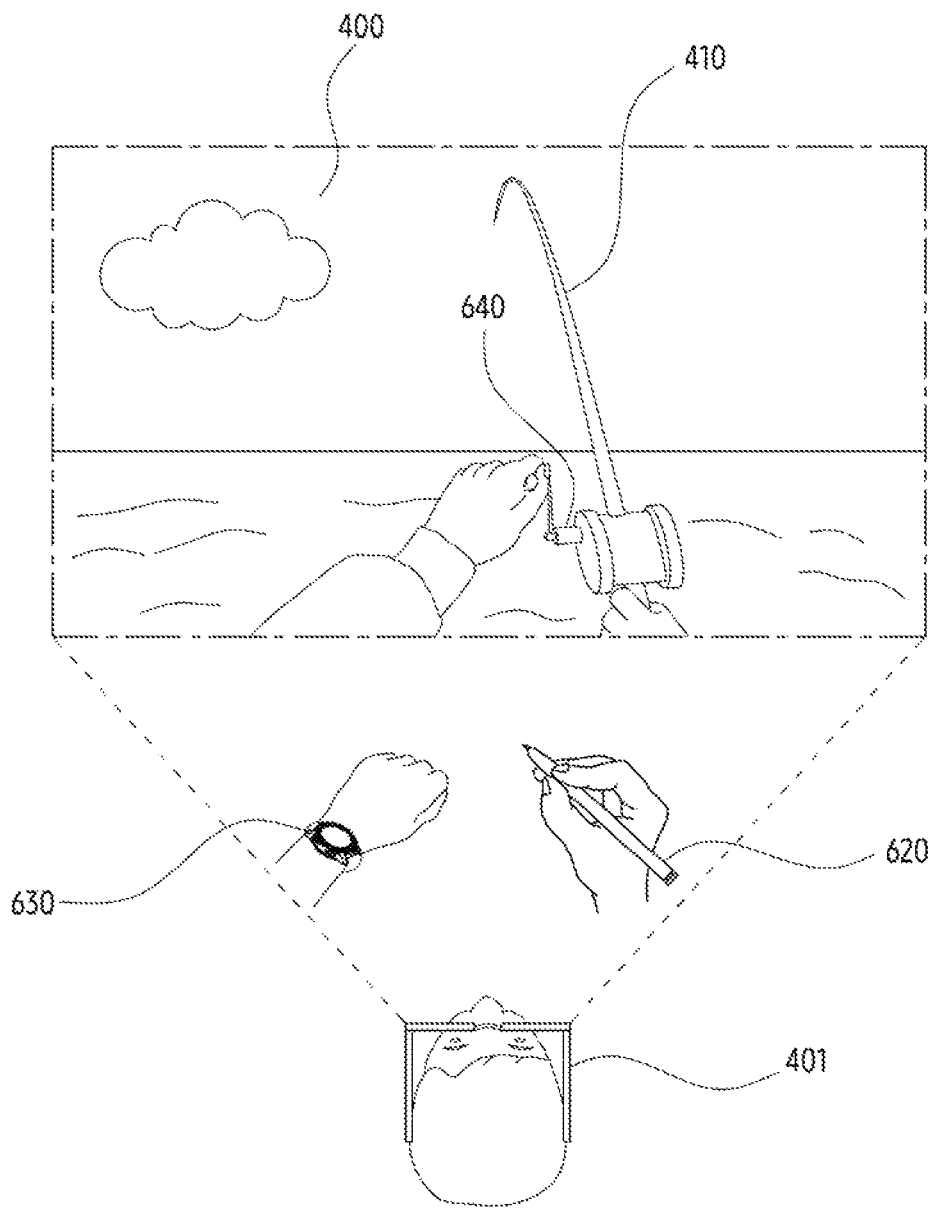
FIG. 6 illustrates an example of a screen displayed in a wearable device, according to an embodiment.

FIG. 6 illustrates an example of a screen displayed in a wearable device, according to an embodiment. A wearable device 401 of FIG. 6 may include the wearable device 401 of FIGS. 4A, 4B, and/or 5. A first external electronic device 620 and a second external electronic device 630 of FIG. 6 may include the external electronic device 402 of FIG. 4A, FIG. 4B, and/or FIG. 5.

Referring to FIG. 6, according to an embodiment, the wearable device 401 may execute an application. The wearable device 401 may display a screen 400 in the FoV, based on execution of the application. The wearable device 401 may display a first visual object 410 and/or a second visual object 640 in the screen 400. For example, the wearable device 401 may identify the first external electronic device 620 and/or the second external electronic device 630, based on an application executed to display the first visual object 410 and/or the second visual object 640. The wearable device 401 may detect a plurality of external electronic devices, in a state displaying the first visual object 410 and/or the second visual object 640. For example, the wearable device 401 may detect a plurality of external electronic devices for changing the visual objects 410 and 640. The wearable device 401 may transmit a first signal for requesting information associated with sensors included in the plurality of external electronic devices to the plurality of external electronic devices, based on the detection of the plurality of external electronic devices. For example, the wearable device 401 may transmit a first signal for requesting information associated with a sensor included in the first external electronic device 620, to the first external electronic device 620. For example, the wearable device 401 may transmit a first signal for requesting information associated with a sensor included in the second external electronic device 630, to the second external electronic device 630.

According to an embodiment, the wearable device 401 may transmit a first signal associated with a sensor included in a plurality of external electronic devices, to the plurality of external electronic devices. The wearable device 401 may receive a second signal including information associated with the sensor from the plurality of external electronic devices receiving the first signal. For example, the second signal may include a category of the sensor. For example, the second signal may include a type of the sensor as information associated with the sensor. For example, the second signal may include the sensitivity of the sensor. Information included in the second signal is not limited to the above-described example.

For example, the wearable device 401 may display a pop-up window (e.g., the pop-up window 420 of FIGS. 4A to 4B) indicating at least a part of the information included in the second signal, based on receiving the second signal. For example, the wearable device 401 may display names of the plurality of external electronic devices, a type (or category) of a sensor included in the plurality of external electronic devices, and/or sensitivity of the sensor included in the plurality of external electronic devices. For example, the wearable device 401 may receive an input to establish a communication link with at least one of the plurality of external electronic devices, in a state displaying the pop-up window. For example, the wearable device 401 may establish a communication link with an external electronic device matching the input, based on receiving the input. For example, the wearable devices 401 may establish a communication link with an external electronic device through a communication circuit (e.g., the communication circuits 540 of FIG. 5).

In an example of FIG. 6, the wearable device 401 may establish a first communication link between the wearable device 401 and the first external electronic device 620, and a second communication link between the wearable device 401 and the second external electronic device 630. The wearable device 401 may receive a third signal for changing a display of the visual objects 410 and 640 from the external electronic devices 620 and 630 in which the communication link is established, based on establishing the communication links. For example, the wearable device 401 may receive a third signal for changing a display of the visual objects 410 and 640, based on sensors included in the external electronic devices 620 and 630. For example, the third signal may include a change in data of sensors included in the external electronic devices 620 and 630 and/or a data value of sensors included in the external electronic devices 620 and 630. The wearable device 401 may change the visual objects 410 and 640 displayed in the screen 400 by the third signal.

In an example of FIG. 6, the wearable device 401 may establish a communication link with the first external electronic device 620 matching the first visual object 410. The wearable device 401 may establish a communication link with the second external electronic device 630 matching the second visual object 640. For example, the wearable device 401 may change a display of the first visual object 410, based on the third signal transmitted from the first external electronic device 620. For example, the wearable device 401 may change a display of the second visual object 640, based on the third signal transmitted from the second external electronic device 630. For example, when the first visual object 410 needs to be changed based on an acceleration sensor, the wearable device 401 may change the first visual object 410, based on the third signal obtained by using the acceleration sensor included in the first external electronic device 620. For example, when the second visual object 640 needs to be changed based on a hall sensor, the wearable device 401 may change the second visual object 640 based on receiving the third signal obtained by using the hall sensor included in the second external electronic device 630. For example, the third signal obtained by using the hall sensor may be associated with a magnetic field change identified by the hall sensor when adjusting a dial and/or wheel included in the second external electronic device 630. According to an embodiment, the wearable device 401 may match visual objects 410 and 640 to a movement of the external electronic devices 620 and 630 based on the third signal transmitted from the external electronic devices 620 and 630. For example, the wearable device 401 may change the visual objects 410 and 640 to match the movement of the external electronic devices 620 and 630. For example, the wearable device 401 may change a display of the visual objects 410 and 640, in association with the external electronic devices 620 and 630.

As described above, according to an embodiment, the wearable device 401 may display the screen 400 in the FoV of the application. The wearable device 401 may display the plurality of visual objects 410 and 640 in the screen 400. The wearable device 401 may identify a plurality of external electronic devices 620 and 630 to change the plurality of visual objects 410 and 640, in a state displaying the plurality of visual objects 410 and 640. The wearable device 401 may transmit a first signal requesting information associated with sensors, based on identifying the plurality of external electronic devices 620 and 630 for changing the plurality of visual objects 410 and 640. The wearable device 401 may transmit a first signal requesting information associated with sensors included in the plurality of external electronic devices 620 and 630, to the plurality of external electronic devices 620 and 630. The wearable device 401 may receive a second signal including the information from the plurality of external electronic devices 620 and 630 receiving the first signal. For example, the wearable device 401 may receive a second signal including information associated with a sensor included in the plurality of external electronic devices 620 and 630, based on transmitting the first signal. The wearable device 401 may establish a communication link with the external electronic devices 620 and 630, based on receiving the second signal. The wearable device 401 may receive a third signal from the external electronic devices 620 and 630, based on the establishment of the communication link. For example, the third signal may include data and/or information for changing the visual objects 410 and 640. For example, the third signal may be associated with data of a sensor included in the external electronic devices 620 and 630. For example, the wearable device 401 may change the visual objects 410 and 640, based on receiving the third signal. The wearable device 401 may change the visual objects 410 and 640, based on the external electronic devices 620 and 630. The wearable device 401 may reduce the calculation by the processor of the wearable device 401, by changing the visual objects 410 and 640 based on the external electronic devices 620 and 630. The wearable device 401 may enhance a user experience of the wearable device 401, by changing the visual objects 410 and 640 based on the external electronic devices 620 and 630.

Figure 7A:
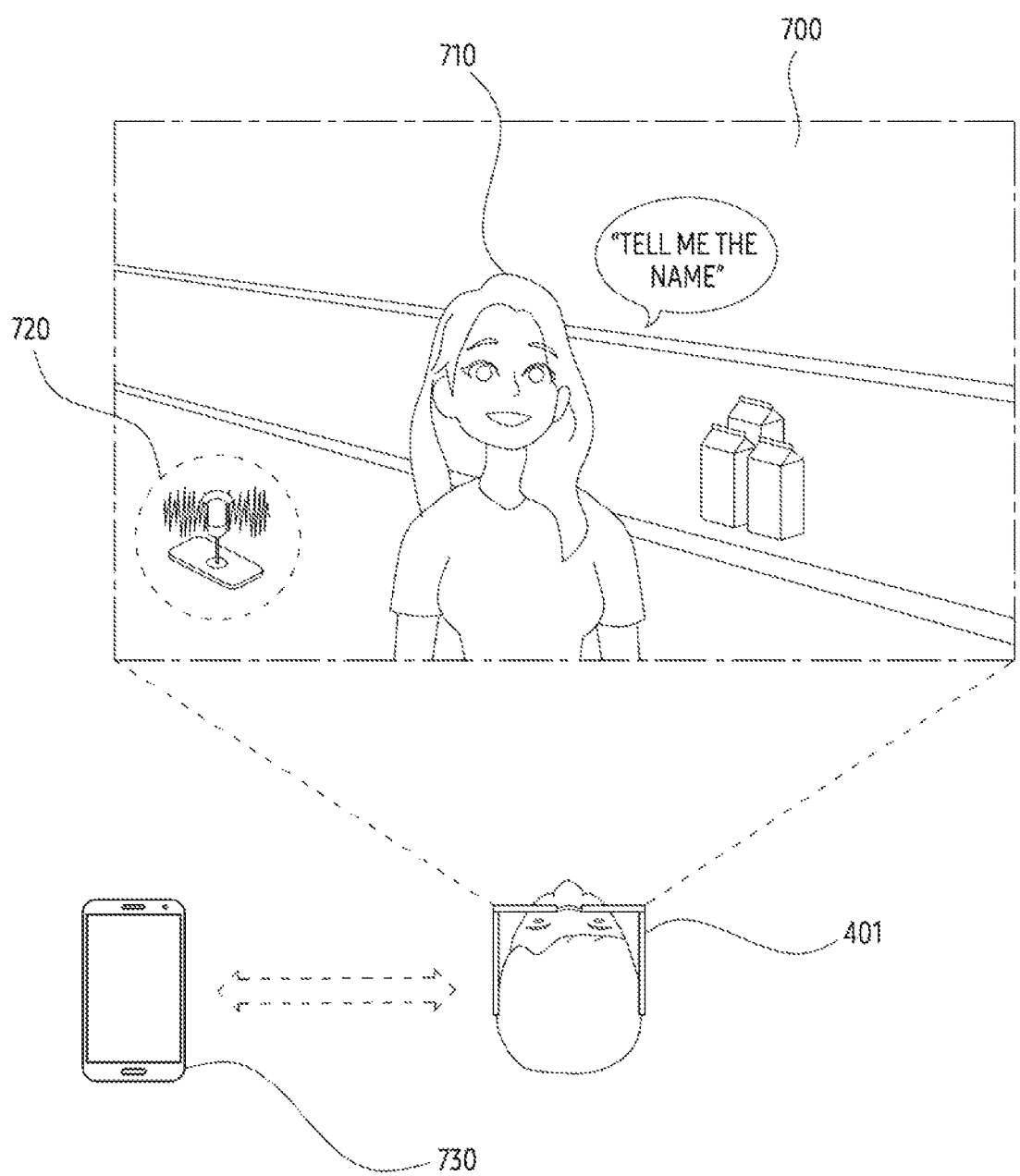
FIG. 7A illustrates an example of a screen displayed in a wearable device, according to an embodiment.
Figure 7B:
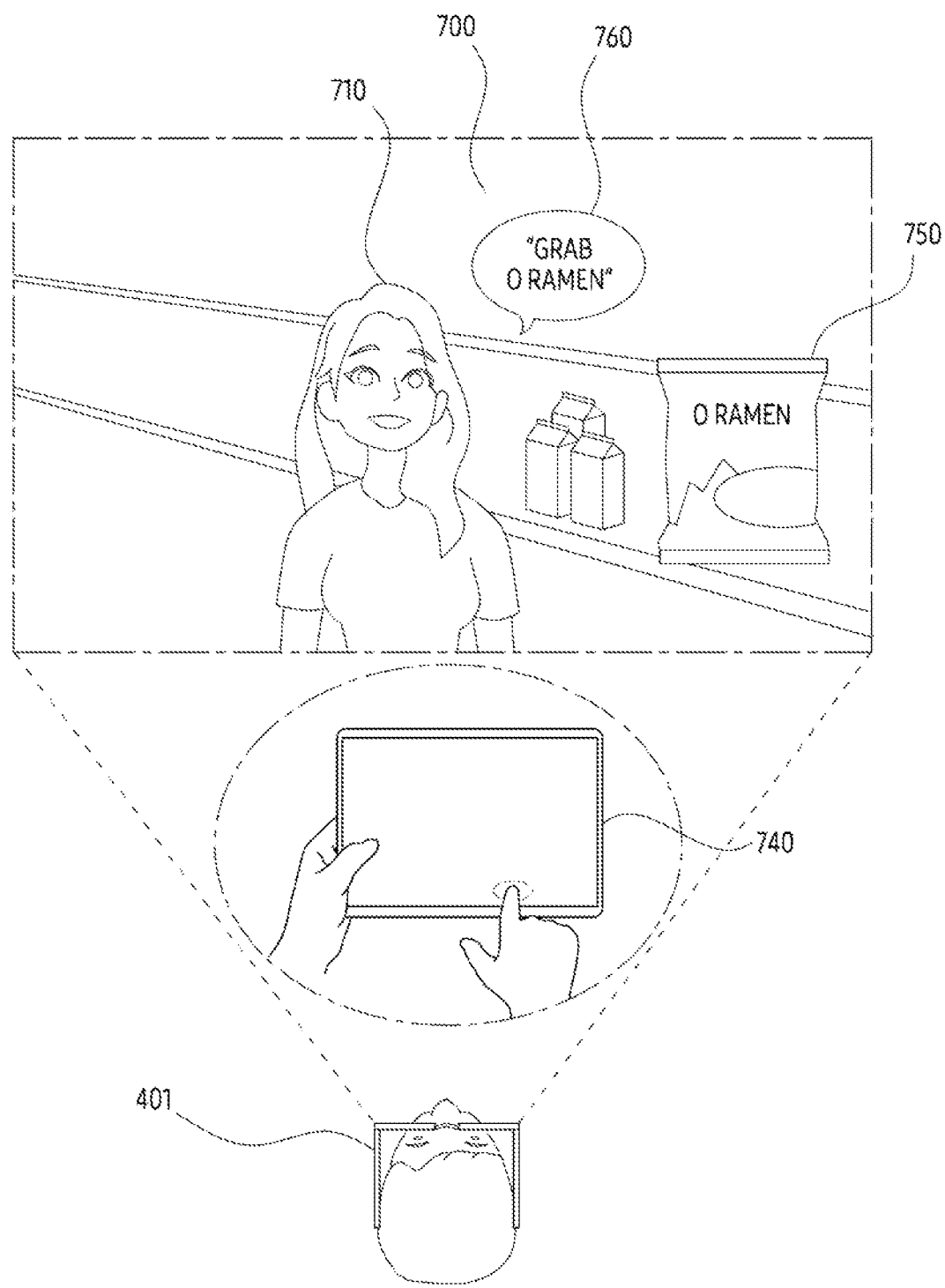
FIG. 7B illustrates an example of a screen displayed in a wearable device, according to an embodiment.

FIG. 7A illustrates an example of a screen displayed in a wearable device, according to an embodiment. FIG. 7B illustrates an example of a screen displayed in a wearable device, according to an embodiment. The wearable device 401 of FIGS. 7A to 7B may include the wearable device 401 of FIGS. 4A, 4B, 5, and/or 6.

Referring to FIGS. 7A to 7B, according to an embodiment, the wearable device 401 may execute an application associated with a purchase of goods. The wearable device 401 may display a screen 700 associated with the application in the FoV, in a state executing the application. The wearable device 401 may display a third visual object 710 based on execution of the application. The wearable device 401 may identify a plurality of external electronic devices while displaying the third visual object 710. The wearable device 401 may transmit a first signal requesting information associated with sensors included in the plurality of external electronic devices, based on identifying the plurality of external electronic devices. The wearable device 401 may receive a second signal including information associated with the sensors from the plurality of external electronic devices receiving the first signal. The wearable device 401 may display a pop-up window including information associated with the plurality of external electronic devices and the sensors, based on receiving the second signal. The wearable device 401 may receive an input indicating to select at least one of the plurality of external electronic devices, while displaying information associated with the plurality of external electronic devices and the sensors in the pop-up window. The wearable device 401 may establish a communication link with at least one of the plurality of external electronic devices based on the input.

According to an embodiment, the wearable device 401 may display a fourth visual object 720, in a state in which a communication link with external electronic device 730 is established. For example, the fourth visual object 720 may be associated with the external electronic device 730. For example, the fourth visual object 720 may be associated with information and/or data obtained by the external electronic device 730. The fourth visual object 720 of FIG. 7A may be associated with the external electronic device 730 for converting a physical signal into an electrical signal, such as a sensor or a microphone of the external electronic device 730. For example, the fourth visual object 720 may be associated with an operation of the external electronic device 730. For example, while the external electronic device 730 obtains an acoustic signal through a microphone, the wearable device 401 may display the fourth visual object 720 including a microphone form. For example, the wearable device 401 may receive a third signal including information associated with the acoustic signal obtained by the external electronic device 730 through the microphone. For example, the wearable device 401 may change the visual object 720 to match the acoustic signal obtained from the external electronic device 730, based on receiving the third signal.

FIG. 7B is an example associated with a fingerprint recognition sensor included in the external electronic device 740. According to an embodiment, the wearable device 401 may display the third visual object 710 based on execution of an application. For example, the wearable device 401 may perform an operation of an application, by using the external electronic device 740. For example, the wearable device 401 may display a fifth visual object 760 for using the external electronic device 740, in order to guide the use. For example, the wearable devices 401 may receive a request associated with biometric information from an external electronic device (e.g., a server) different from the external electronic devices 730 and 740. For example, the wearable device 401 may identify the plurality of external electronic devices to receive a signal including biometric information. The wearable device 401 may identify the plurality of external electronic devices while displaying the fifth visual object 760. The wearable device 401 may transmit a first signal for requesting information associated with the fingerprint recognition sensor included in the plurality of external electronic devices, to the plurality of external electronic devices. The wearable device 401 may receive a second signal including information associated with the fingerprint recognition sensor from the external electronic device 740 including a fingerprint recognition sensor and receiving the first signal.

While displaying the third visual object 710, the wearable device 401 may perform an operation associated with the sixth visual object 750. For example, the wearable device 401 may perform an operation of purchasing the sixth visual object 750. For example, the wearable device 401 may perform an operation of purchasing a product associated with the sixth visual object 750. When it is necessary to authenticate biometric information using a fingerprint recognition sensor, the wearable device 401 may authenticate the biometric information based on a fingerprint recognition sensor of the external electronic device 740. For example, the wearable device 401 may receive a fourth signal including the biometric information from the external electronic device 740. An example of obtaining the biometric information may include a fingerprint recognition, a face recognition, and/or a gaze recognition. However, it is not limited thereto.

As described above, according to an embodiment, while executing the application, the wearable device 401 may receive a signal including a microphone and/or a biometric information recognition sensor of the external electronic device 730 and 740. The wearable device 401 may receive the signal, in a state connected to the external electronic devices 730 and 740. The wearable device 401 may perform a necessary operation in the application, based on receiving the signal. The wearable device 401 may perform the necessary operation in the application, by using the external electronic devices 730 and 740. The wearable devices 401 may reduce computation of the processor, by performing a necessary operation in the application using the external electronic devices 730 and 740. The wearable device 401 may enhance a user experience of the wearable device 401 by performing a necessary operation in the application using the external electronic devices 730 and 740.

Figure 8:
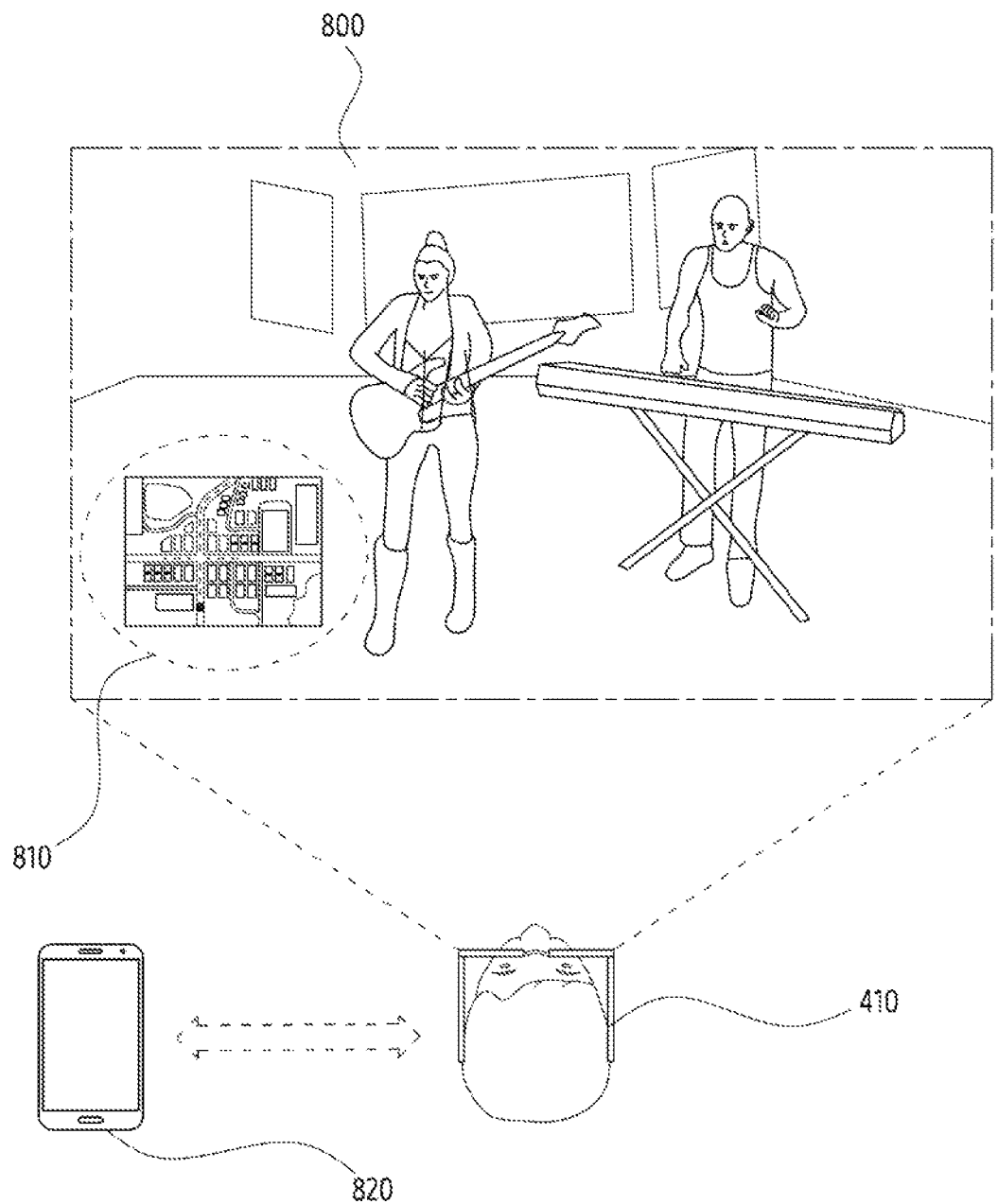
FIG. 8 illustrates an example of a screen displayed in a wearable device, according to an embodiment.

FIG. 8 illustrates an example of a screen displayed in a wearable device, according to an embodiment. The wearable device 401 of FIG. 8 may include the wearable device 401 of FIG. 4A, FIG. 4B, FIG. 5, FIG. 6, FIG. 7A, and/or FIG. 7B.

Referring to FIG. 8, according to an embodiment, the wearable device 401 may execute an application. The wearable device 401 may display a screen 800 in the FoV, based on execution of the application. In a state in which the screen 800 is displayed, the wearable device 401 may establish a communication link with the external electronic device 820. The wearable device 401 may display a seventh visual object 810 from an external electronic device 820, based on establishing a communication link with the external electronic device 820. For example, the wearable device 401 may display the seventh visual object 810 on at least a part of the screen 800. For example, the seventh visual object 810 may be associated with an application executed in the external electronic device 820. For example, the seventh visual object 810 may include a screen being executed through the external electronic device 820. For example, the seventh visual object 810 may be associated with a map application executed within the external electronic device 820.

According to an embodiment, the wearable device 401 may receive information for displaying a screen of an application being executed through the external electronic device 820 from external electronic device 820. For example, the wearable device 401 may display the seventh visual object 810 based on receiving information for displaying a screen of an application indicating a location of the external electronic device 820 by using a GPS sensor included in the external electronic device 820.

According to an embodiment, the wearable device 401 may display the seventh visual object 810 while the user of wearable device 401 is moving. For example, the wearable device 401 may display the seventh visual object 810 based on a changing data of a GPS sensor of the external electronic device 820 while the user is moving. For example, the wearable device 401 may receive a signal including data of the GPS sensor from the external electronic device 820. For example, the wearable device 401 may display the seventh visual object 810 based on receiving the signal. Although the seventh visual object 810 associated with a map application is displayed in FIG. 8, it is not limited thereto.

As described above, according to an embodiment, the wearable device 401 may receive information for displaying a screen displayed through a display of the external electronic device 820. The wearable device 401 may receive a signal including information for displaying the screen. The wearable device 401 may display a screen of the external electronic device 820 on at least a part of the screen 800 displayed in the FoV of the wearable device 401, based on receiving the signal. The wearable device 401 may enhance a user experience of the wearable device 401 by displaying the screen of the external electronic device 820 on at least a part of the screen 800.

Figure 9:
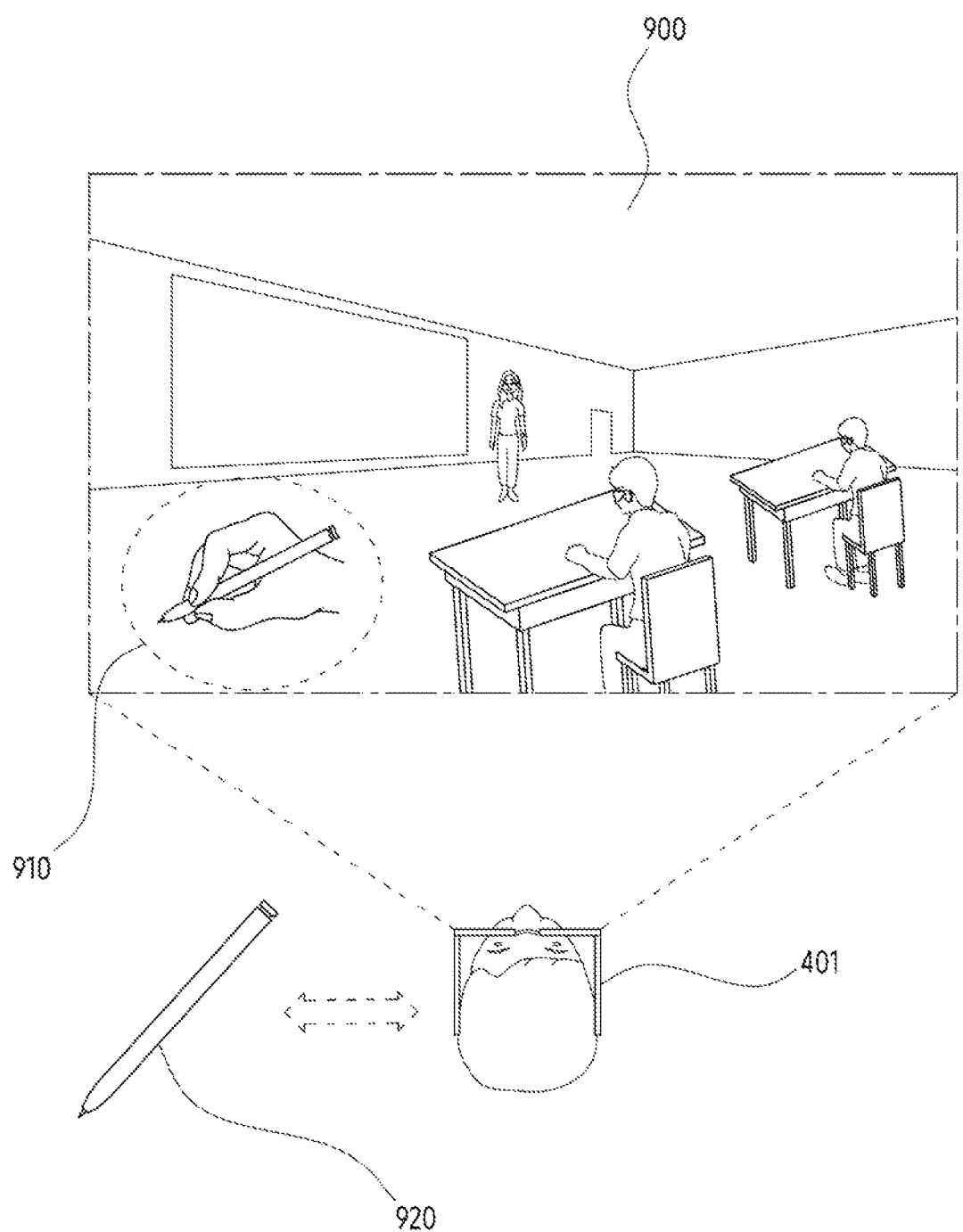
FIG. 9 illustrates an example of a screen displayed in a wearable device according to an embodiment.

FIG. 9 illustrates an example of a screen displayed in a wearable device according to an embodiment. A wearable device 401 of FIG. 9 may include the wearable device 401 of FIG. 4A, FIG. 4B, FIG. 5, FIG. 6, FIG. 7A, FIG. 7B, and/or FIG. 8.

Referring to FIG. 9, according to an embodiment, the wearable device 401 may execute an application associated with writing. The wearable device 401 may display a screen 900 in the FoV, based on executing the application associated with writing. The wearable device 401 may identify an external electronic device 920 based on an application executed to display an eighth visual object 910. The wearable device 401 may identify a plurality of external electronic devices based on execution of the application. For example, the wearable device 401 may identify an external electronic device 920 for a writing input among the plurality of external electronic devices.

According to an embodiment, the wearable device 401 may establish a communication link with the external electronic device 920 based on identifying the external electronic device 920 for a writing input. The wearable device 401 may display the eighth visual object 910 based on establishing a communication link with the external electronic device 920. For example, the eighth visual object 910 may include an image matching a form of the external electronic device 920 and/or the user's hand of the external electronic device 920. For example, the eighth visual object 910 may be changed based on an acceleration sensor and/or a touch sensor included in the external electronic device 920. For example, the wearable device 401 may receive a third signal for changing the eighth visual object 910. For example, the third signal may include data associated with an acceleration sensor and/or a touch sensor included in the external electronic device 920. The wearable device 401 may change a display of the eighth visual object 910, based on receiving the third signal including data associated with the acceleration sensor and/or the touch sensor. For example, the wearable device 401 may display and/or change the seventh visual object in association with a movement of external electronic device 920.

The wearable device 401 may display a ninth visual object different from the eighth visual object 910 that matches the movement of the external electronic device 920, based on receiving the third signal. For example, the wearable device 401 may display one or more strokes inputted by the external electronic device 920 in the ninth visual object. The one or more strokes may be displayed based on the third signal.

As described above, according to an embodiment, the wearable device 401 may establish a communication link with the external electronic device 920. The wearable device 401 may receive a third signal including data associated with the movement of the external electronic device 920, in a state that the communication link is established. The wearable device 401 may perform an operation matching the movement of the external electronic device 920, based on receiving the third signal. For example, one or more strokes associated with the matching operation may be displayed in the ninth visual object displayed on at least a part of the screen 900. The wearable device 401 may enhance a user experience of the wearable device 401, by displaying an operation matching the movement of the external electronic device 920 on the screen 900.

Figure 10:
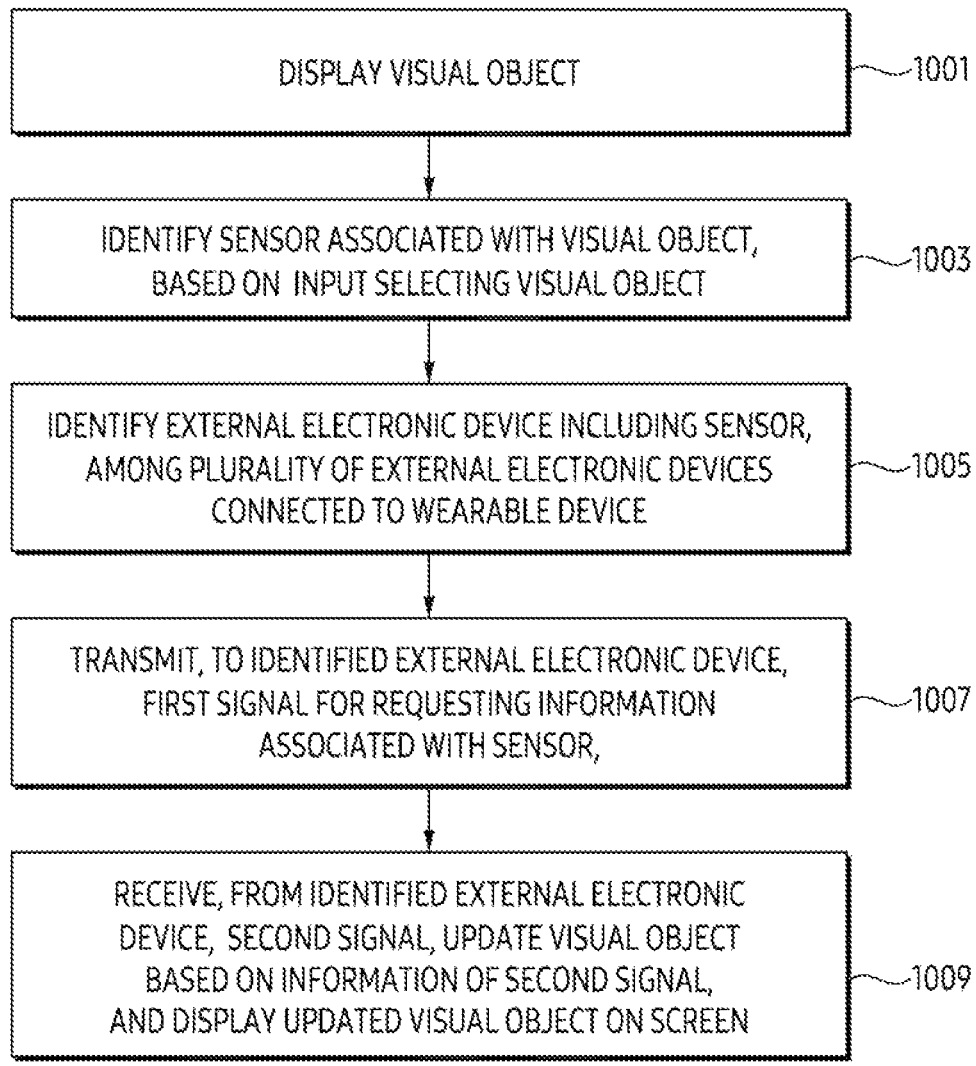
FIG. 10 illustrates an example of a flowchart of an operation of a wearable device, according to an embodiment.

FIG. 10 illustrates an example of a flowchart of an operation of a wearable device, according to an embodiment. The wearable device of FIG. 10 may include the wearable device 401 of FIG. 4A, FIG. 4B, FIG. 5, FIG. 6, FIG. 7A, FIG. 7B, FIG. 8, and/or FIG. 9. Operations of FIG. 10 may be executed by a processor (e.g., the processor 510 of FIG. 5) of the wearable device 401. In the following embodiment, each operation may be performed sequentially, but is not necessarily performed sequentially. For example, the order of each operation may be changed, and at least two operations may be performed in parallel.

Referring to FIG. 10, in operation 1001, according to an embodiment, the wearable device may display a visual object. In an embodiment, the wearable device may display a visual object within the FoV of the wearable device by controlling the display. In an embodiment, the wearable device may be worn by a user. The wearable device may control a display (e.g., the display 530 of FIG. 5) while worn by the user. For example, the wearable device may identify an external electronic device based on an application executed to display a visual object. According to an embodiment, the wearable device may display a visual object within the FoV of the wearable device while worn by the user, by controlling a display.

In operation 1003, according to an embodiment, the wearable device may determine a sensor associated with (or to be used with) the visual object, based on an input (e.g., the user's input) selecting (or indicating to select) the visual object. In an embodiment, the wearable device may identify an input selecting (or indicating to select) the user's visual object. The wearable device may identify a sensor associated with (or to be used with) the visual object based on identifying the input. For example, the wearable device may identify a sensor associated with (or to be used with) the visual object, to change a display of the visual object.

In operation 1005, according to an embodiment, the wearable device may determine an external electronic device (among a plurality of external electronic devices connected to the wearable device) that includes the sensor determined in operation 1003. In an embodiment, the wearable device may identify a plurality of external electronic devices based on identifying a sensor associated with a visual object. The wearable device may identify an external electronic device including a sensor associated with a visual object, among a plurality of external electronic devices connected to the wearable device, for example, through a communication circuit (e.g., the communication circuit 540 of FIG. 5).

In operation 1007, according to an embodiment, the wearable device may transmit, to the external electronic device determined in operation 1005, a first signal for requesting information associated with a sensor. In an embodiment, the wearable device may transmit a first signal for requesting information associated with a sensor to the identified external electronic device, among the plurality of external electronic devices. For example, information associated with the sensor may include a category of the sensor. The information associated with the sensor may include a type of the sensor. For example, the information associated with the sensor may include information associated with sensitivity of the sensor. According to an embodiment, the wearable device may transmit a first signal including the information to the external electronic device.

In operation 1009, according to an embodiment, the wearable device may receive, from the determined external electronic device, a second signal; update the visual object based on information of the second signal; and display the updated visual object on the screen. In an embodiment, the wearable device may receive a second signal from an external electronic device receiving the first signal for requesting information associated with the sensor. In an embodiment, the wearable device may receive a second signal including the information from an external electronic device receiving the first signal. The wearable device may identify information included in the second signal based on receiving the second signal. In an embodiment, the wearable device may display the visual object within the FoV, based on identifying information included in the second signal. For example, the wearable device may receive a third signal for changing the visual object from an external electronic device, based on receiving the second signal. For example, the wearable device may change the visual object based on receiving the third signal. For example, the third signal may be associated with an electrical signal obtained from a sensor included in the external electronic device. Based on the third signal, the wearable device may change a display of the visual object.

As described above, according to an embodiment, the wearable device may display a visual object in the FoV while worn by the user. The wearable device may identify a sensor associated with the visual object. Based on identifying the sensor, the wearable device may transmit a first signal for requesting information associated with a sensor included in the external electronic device, to the external electronic device. The wearable device may receive a second signal including the information, from the external electronic device receiving the first signal. The wearable device may receive a third signal for changing a display of the visual object from the external electronic device, based on receiving the second signal. The wearable device may change a display of the visual object based on receiving the third signal. The wearable device may change a visual object based on the external electronic device. The wearable device may enhance a user experience of the wearable device by changing the visual object based on the external electronic device.

Figure 11:
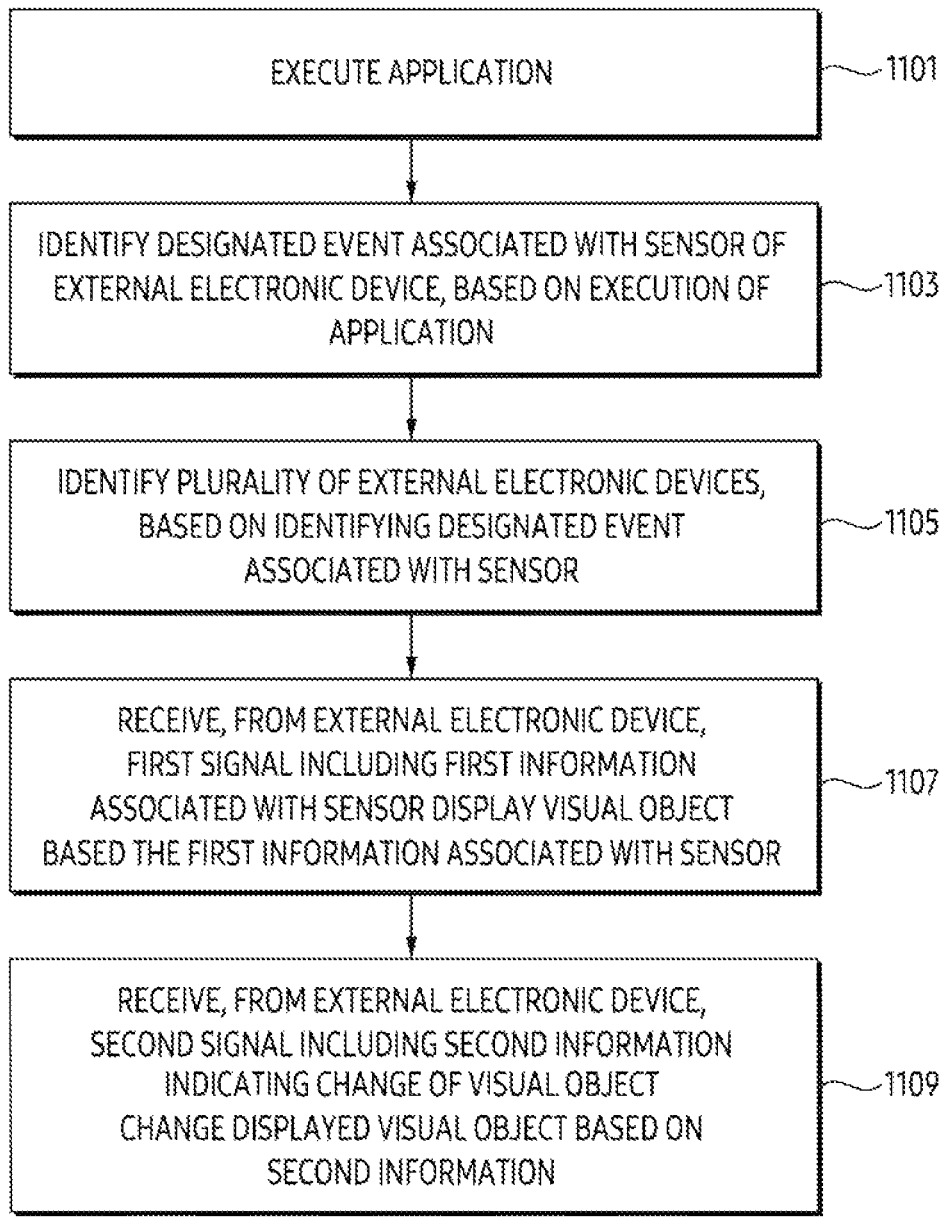
FIG. 11 illustrates an example of a flowchart of an operation of a wearable device, according to an embodiment.

FIG. 11 illustrates an example of a flowchart of an operation of a wearable device, according to an embodiment. A wearable device of FIG. 11 may include the wearable device 401 of FIG. 4A, FIG. 4B, FIG. 5, FIG. 6, FIG. 7A, FIG. 7B, FIG. 8, and/or FIG. 9, and/or the wearable device of FIG. 10. Operations of FIG. 11 may be executed by a processor (e.g., the processor 510 of FIG. 5) of the wearable device. In the following embodiment, each operation may be performed sequentially, but is not necessarily performed sequentially. For example, the order of each operation may be changed, and at least two operations may be performed in parallel.

Referring to FIG. 11, in operation 1101, according to an embodiment, the wearable device may execute an application. The wearable device may display a screen associated with the application in the FoV of the wearable device, based on execution of the application. Based on the application executed to display a visual object, the external wearable device may display a visual object while displaying the screen.

In operation 1103, according to an embodiment, the wearable device may determine a designated event associated with a sensor of an external electronic device. In an embodiment, the wearable device may identify a designated event based on execution of the application. In an embodiment, the wearable device may identify designated events for using a sensor (or a component for input) of the external electronic device based on execution of the application. For example, the designated event may be associated with a visual object displayed on a screen of the wearable device. For example, the designated event may be associated with an input indicating to select a visual object displayed on the screen of the wearable device. The wearable device may identify the designated event in response to the input.

In operation 1105, according to an embodiment, the wearable device may determine a plurality of external electronic devices, based on the determined designated event associated with the sensor. The plurality of external electronic devices may include the sensor associated with the determined designated event. In an embodiment, the wearable device may identify a plurality of external electronic devices based on identifying the designated event. For example, the wearable device may identify one or more sensors included in the plurality of external electronic devices. For example, the wearable device may receive a first signal from the plurality of external electronic devices, in order to identify one or more sensors included in the plurality of external electronic devices. Alternatively, for example, the wearable device may receive a first signal including first information associated with a sensor included in one external electronic device of the plurality of external electronic devices. The wearable device may establish a communication link with the external electronic devices based on the received first signal.

In operation 1107, according to an embodiment, the wearable device may receive, from the external electronic device, a first signal including first information associated with the sensor and may display a visual object based on the first information associated with the sensor. In an embodiment, the wearable device may receive a first signal (including first information associated with the sensor of the external electronic device) from the external electronic device of the plurality of external electronic devices. The wearable device may display a visual object based on the first information of the first signal. For example, the wearable device may display the visual object in association with an external electronic device. For example, the wearable device may receive first information including data associated with a movement and/or motion of the external electronic device. The wearable device may display a visual object in association with the external electronic device based on receiving the first information.

In operation 1109, according to an embodiment, the wearable device may receive, from the external electronic device, a second signal including second information indicating a change of the displayed visual object and may change the displayed visual object based on the second information. In an embodiment, the wearable device may receive a second signal including second information indicating a change of a visual object, from an external electronic device. The wearable device may change the visual object based on receiving the second signal. For example, the second information may be associated with an electrical signal obtained by a sensor of the external electronic device. For example, the second information may include an electrical signal obtained by the sensor of the external electronic device. For example, the second information may include data associated with an electrical signal obtained by the sensor. The wearable device may change a display of the visual object in association with an external electronic device, based on receiving the second signal including the second information.

A wearable device may execute an application. The wearable device may display a screen associated with an application while executing the application. The wearable device may require an input for changing a display of a visual object displayed on a screen while displaying the screen.

As described above, according to an embodiment, a wearable device 401 may comprise a communication circuit 540, a display 530, and a processor 510. The processor 510 may be configured to display, while worn by a user, a screen 400 including a visual object 410 in a field-of-view (FoV) of the wearable device 401 by controlling the display 530. The processor 510 may be configured to identify, based on identifying an input of the user indicating to select the visual object, a sensor 550 associated with the visual object 410. The processor 510 may be configured to identify, among a plurality of external electronic devices connected to the wearable device 401 through the communication circuit 540, an external electronic device 402 including the sensor associated with the visual object. The processor 510 may be configured to transmit, to the identified external electronic device 402 from the plurality of external electronic devices, a first signal for requesting information associated with the sensor 550. The processor 510 may be configured to, based on receiving a second signal including the information from the external electronic device 402 receiving the first signal, display the visual object 410 in the FoV based on the information included in the second signal.

As described above, according to an embodiment, the wearable device may change a display of a visual object based on a signal transmitted from an external electronic device to control the visual object displayed on the screen.

According to an embodiment, the processor 510 may be configured to display, based on identifying the external electronic device 402 including the sensor 550 associated with the visual object 410, a pop-up window 420 for selecting the external electronic device 402 in the FoV.

According to an embodiment, the processor 510 may be configured to, based on identifying the input indicating to select the visual object 410, identify, from categories for classifying the sensor 550, a category associated with the visual object 410.

According to an embodiment, the processor 510 may be configured to, based on execution of an application, display the visual object 410. The processor 510 may be configured to identify, based on displaying the visual object 410, the category associated with the visual object 410 and associated with the application.

According to an embodiment, the processor 510 may be configured to, based on receiving a third signal for changing representation of the visual object 410 which is received from the external electronic device 402 while displaying the visual object 410, change the visual object 410 based on the received third signal.

According to an embodiment, the processor 510 may be configured to display the information associated with the sensor 550 included in the external electronic device 402 in the pop-up window 420.

According to an embodiment, the processor 510 may be configured to transmit, to the external electronic device 402, a fourth signal for requesting transmitting of second information that is associated with a state of the external electronic device 402 and different from the information that is first information.

According to an embodiment, the processor 510 may be configured to, in response to receiving a fifth signal including the second information from the external electronic device 402 receiving the fourth signal, display, based on the second information included in the fifth signal, a second visual object that is associated with the state of the electronic device electronic device 402 and is different from the visual object 410 that is the first visual object.

According to an embodiment, the processor 510 may be configured to, among the plurality of external electronic devices, identify the external electronic device 402 including the sensor 550 associated with the visual object 410 based on first radio access technology (RAT).

As described above, according to an embodiment, a method of a wearable device 401 may comprise displaying, while worn by a user, a screen 400 including visual object 410 in a field-of-view (FoV) of the wearable device 401 by controlling the display 530. The method may comprise identifying, based on identifying an input of the user indicating to select the visual object, a sensor 550 associated with the visual object 410. The method may comprise identifying, among a plurality of external electronic devices 402 connected to the wearable device 401 through a communication circuit 540, an external electronic device 402 including the sensor 550 associated with the visual object 410. The method may comprise transmitting, to the identified external electronic device 402 from the plurality of external electronic devices, a first signal for requesting information associated with the sensor 550. The method may comprise, based on receiving a second signal including the information from the external electronic device 402 receiving the first signal, displaying the visual object 410 in the FoV based on the information included in the second signal.

According to an embodiment, the method may comprise displaying, based on identifying the external electronic device 402 including the sensor 550 associated with the visual object 410, a pop-up window 420 for selecting the external electronic device 402 in the FoV.

According to an embodiment, the method may comprise, based on identifying the input indicating to select the visual object 410, identifying, from categories for classifying the sensor 550, a category associated with the visual object 410.

According to an embodiment, the method may comprise, based on execution of an application, displaying the visual object 410. The method may comprise identifying, based on displaying the visual object 410, the category associated with the visual object 410 and associated with the application.

According to an embodiment, the method may comprise, based on receiving a third signal for changing representation of the visual object 410 which is received from the external electronic device 402 while displaying the visual object 410, changing the visual object 410 based on the received third signal.

According to an embodiment, the method may comprise displaying the information associated with the sensor 550 included in the external electronic device 402 in the pop-up window 420.

According to an embodiment, the method may comprise transmitting, to the external electronic device 402, a fourth signal for requesting transmitting of second information that is associated with a state of the external electronic device 402 and different from the information that is first information.

According to an embodiment, the method may comprise, in response to receiving a fifth signal including the second information from the external electronic device 402 receiving the fourth signal, displaying, based on the second information included in the fifth signal, a second visual object that is associated with the state of the electronic device electronic device 402 and is different from the visual object 410 that is the first visual object.

According to an embodiment, the method may comprise, among the plurality of external electronic devices, identifying the external electronic device 402 including the sensor 550 associated with the visual object 410 based on first radio access technology (RAT).

As described above, according to an embodiment, a computer-readable medium for storing one or more programs, the one or more programs may be configured to, when executed by a processor 510 of a wearable device 401, cause the processor 510 of the wearable device 401 to display, while worn by a user, a screen 400 including visual object 410 in a field-of-view (FoV) of the wearable device 401 by controlling a display 530. The one or more programs may be configured to, when executed by the processor 510 of the wearable device 401, cause the processor 510 of the wearable device 401 to identify, based on identifying an input of the user indicating to select the visual object 410, a sensor 550 associated with the visual object 410. The one or more programs may be configured to, when executed by the processor 510 of the wearable device 401, cause the processor 510 of the wearable device 401 to identify, among a plurality of external electronic devices connected to the wearable device 401 through a communication circuit 540, an external electronic device 402 including the sensor 550 associated with the visual object 410. The one or more programs may be configured to, when executed by the processor 510 of the wearable device 401, cause the processor 510 of the wearable device 401 to transmit, to the identified external electronic device 402 from the plurality of external electronic devices, a first signal for requesting information associated with the sensor 550. The one or more programs may be configured to, when executed by the processor 510 of the wearable device 401, cause the processor 510 of the wearable device 401 to, based on receiving a second signal including the information from the external electronic device 402 receiving the first signal, display the visual object 410 in the FoV based on the information included in the second signal.

According to an embodiment, the one or more programs may be configured to, when executed by the processor 510 of the wearable device 401, cause the processor 510 of the wearable device 401 to display, based on identifying the external electronic device 402 including the sensor 550 associated with the visual object 410, a pop-up window 420 for selecting the external electronic device 402 in the FoV.

According to an embodiment, the one or more programs may be configured to, when executed by the processor 510 of the wearable device 401, cause the processor 510 of the wearable device 401 to, identify, from categories for classifying the sensor 550, a category associated with the visual object 410, based on identifying the input indicating to select the visual object 410.

According to an embodiment, the one or more programs may be configured to, when executed by the processor 510 of the wearable device 401, cause the processor 510 of the wearable device 401 to display the visual object 410, based on execution of an application. The one or more programs may be configured to, when executed by the processor 510 of the wearable device 401, cause the processor 510 of the wearable device 401 to identify, based on displaying the visual object 410, the category associated with the visual object 410 and associated with the application.

According to an embodiment, the one or more programs may be configured to, when executed by the processor 510 of the wearable device 401, cause the processor 510 of the wearable device 401 to change the visual object 410 based on the received third signal, based on receiving a third signal for changing representation of the visual object 410 which is received from the external electronic device 402 while displaying the visual object 410.

According to an embodiment, the one or more programs may be configured to, when executed by the processor 510 of the wearable device 401, cause the processor 510 of the wearable device 401 to display the information associated with the sensor 550 included in the external electronic device 402 in the pop-up window 420.

According to an embodiment, the one or more programs may be configured to, when executed by the processor 510 of the wearable device 401, cause the processor 510 of the wearable device 401 to transmit, to the external electronic device 402, a fourth signal for requesting transmitting of second information that is associated with a state of the external electronic device 402 and is different from the information that is first information.

According to an embodiment, the one or more programs may be configured to, when executed by the processor 510 of the wearable device 401, cause the processor 510 of the wearable device 401 to, in response to receiving a fifth signal including the second information from the external electronic device 402 receiving the fourth signal, display, based on the second information included in the fifth signal, a second visual object that is associated with the state of the electronic device electronic device 402 and is different from the visual object 410 that is the first visual object.

According to an embodiment, the one or more programs may be configured to, when executed by the processor 510 of the wearable device 401, cause the processor 510 of the wearable device 401 to, among the plurality of external electronic devices, identify the external electronic device 402 including the sensor 550 associated with the visual object 410 based on first radio access technology (RAT).

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program) including one or more instructions that are stored in a storage medium (e.g., internal memory or external memory) that is readable by a machine (e.g., the electronic device 402). For example, a processor (e.g., the processor 510) of the machine (e.g., the electronic device 402) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable device comprising:
a communication circuit;
a display; and
a processor,
wherein the processor is configured to:
    display a visual object in the display;
    identify, based on an input of a user selecting the visual object, a sensor associated with the visual object;
    identify, among a plurality of external electronic devices connected to the wearable device through the communication circuit, an external electronic device comprising the sensor associated with the visual object;
    transmit, to the identified external electronic device, a first signal for requesting information associated with the sensor;
    receive a second signal comprising the information associated with the sensor;
    update the visual object based on based on the information; and
    display the updated visual object in the display.

2. The wearable device of claim 1, wherein the processor is further configured to display a pop-up window for selecting the external electronic device in the display.

3. The wearable device of claim 1, wherein the processor is further configured to:
    based on the input of the user, identify, from categories for classifying the sensor, a category associated with the visual object.

4. The wearable device of claim 3, wherein the processor is further configured to:
    display the visual object based on execution of an application; and
    identify, based on the displayed visual object, the category associated with the visual object and associated with the application.

5. The wearable device of claim 1, wherein the processor is further configured to:
    based on a third signal received from the external electronic device, change the visual object based on the received third signal.

6. The wearable device of claim 5, wherein the processor is further configured to display the information associated with the sensor in a pop-up window.

7. The wearable device of claim 1,
wherein the information is first information,
wherein the processor is further configured to transmit, to the external electronic device, a fourth signal for requesting transmission of second information different from the first information, and
wherein the second information is associated with a state of the external electronic device.

8. The wearable device of claim 7, wherein the visual object is first visual object, and
wherein the processor is further configured to:
    in response to receiving, from the external electronic device, a fifth signal comprising the second information, display, based on the second information of the fifth signal, another visual object associated with the state of the electronic device electronic device.

9. The wearable device of claim 1, wherein the processor is further configured to:
    identify the external electronic device based on first radio access technology (RAT).

10. A method of a wearable device, comprising:
displaying a visual object in a display of the wearable device;
identifying, based on an input of the user, a sensor associated with the visual object;
identifying, among a plurality of external electronic devices, an external electronic device comprising the sensor associated with the visual object;
transmitting, to the identified external electronic device, a first signal for requesting information associated with the sensor;
receiving, from the identified external electronic device, a second signal comprising the information;
updating the visual object based on the information, and
displaying the updated visual object in the display of the wearable device.

11. The method of claim 10, further comprising displaying, in the display of the wearable device, a pop-up window for selecting the external electronic device.

12. The method of claim 10, further comprising, based on the input of the user, identifying, from categories for classifying the sensor, a category associated with the visual object.

13. The method of claim 12, wherein the displaying the visual object comprises the displaying the visual object based on execution of an application; and
wherein the identifying, from categories for classifying the sensor, the category associated with the visual object comprises identifying the category associated with the visual object and associated with the application.

14. The method of claim 10, further comprising:
receiving, from the external electronic device, a third signal for changing representation of the visual object which is received while displaying the visual object; and
changing the visual object based on the received third signal.

15. The method of claim 11, further comprising displaying the information in the pop-up window.

16. The method of claim 10, wherein the information is first information,
wherein the method further comprising transmitting, to the external electronic device, a fourth signal for requesting transmitting of second information; and
wherein the second information is associated with a state of the external electronic device.

17. The method of claim 16, further comprising, in response to receiving, from the external electronic device, a fifth signal comprising the second information, displaying, based on the second information, another visual object that is associated with the state of the electronic device electronic device.

18. The method of claim 10, wherein the identifying the external electronic device comprises identifying the external electronic device based on first radio access technology (RAT).

19. A computer-readable medium for storing one or more programs, wherein the one or more programs are configured to, when executed by a processor of an wearable device, cause the processor of the wearable device to:
display a visual object in a display of the wearable device;
identify, based on an input of the user, a sensor associated with the visual object;
identify, among a plurality of external electronic devices connected to the wearable device through a communication circuit, an external electronic device comprising the sensor associated with the visual object;
transmit, to the identified external electronic, a first signal for requesting information associated with the sensor;
receiving, from the determined external electronic, a second signal comprising the information; and
updating the visual object based on the information; and
displaying the updated visual object in the display of the wearable device.

20. The computer-readable medium of claim 19, wherein the one or more programs are configured to, when executed by the processor of the wearable device, cause the processor of the wearable device to:
display, based on identifying the external electronic device, a pop-up window for selecting the external electronic device in the display of the wearable device.

* * * * *